US011331801B2

(12) United States Patent
Pajovic et al.

(10) Patent No.: US 11,331,801 B2
(45) Date of Patent: May 17, 2022

(54) SYSTEM AND METHOD FOR PROBABILISTIC MULTI-ROBOT POSITIONING

(71) Applicant: Mitsubishi Electric Research Laboratories, Inc., Cambridge, MA (US)

(72) Inventors: Milutin Pajovic, Cambridge, MA (US); Vikrant Shah, Jamaica Plain, MA (US); Philip Orlik, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 379 days.

(21) Appl. No.: 16/202,193

(22) Filed: Nov. 28, 2018

(65) Prior Publication Data

US 2020/0164508 A1 May 28, 2020

(51) Int. Cl.
*B25J 9/16* (2006.01)
*B25J 9/00* (2006.01)

(52) U.S. Cl.
CPC ........... *B25J 9/1653* (2013.01); *B25J 9/0084* (2013.01); *B25J 9/1664* (2013.01); *B25J 9/1697* (2013.01)

(58) Field of Classification Search
CPC ...... B25J 9/1653; B25J 9/0084; B25J 9/1664; B25J 9/1697; B25J 9/1682; G05B 2219/39146
USPC .................................. 700/62, 245, 248, 262
See application file for complete search history.

(56) References Cited

U.S. PATENT DOCUMENTS

| 4,763,276 A | * | 8/1988 | Perreirra | B25J 9/1653 |
| | | | | 700/254 |
| 2004/0167667 A1 | * | 8/2004 | Goncalves | G01C 21/12 |
| | | | | 700/245 |
| 2004/0167669 A1 | * | 8/2004 | Karlsson | G05D 1/024 |
| | | | | 700/259 |

(Continued)

FOREIGN PATENT DOCUMENTS

| CN | 103914069 | * | 3/2014 | ............... G05D 1/02 |
| WO | WO2020048623 | * | 3/2020 | ............. G01C 21/26 |

OTHER PUBLICATIONS

CN103914069A—translate (Year: 2014).*
International Search Report (dated 2020).*

*Primary Examiner* — B M M Hannan
(74) *Attorney, Agent, or Firm* — Gennadiy Vinokur; Hironori Tsukamoto

(57) ABSTRACT

A system for estimating a pose of a robot includes a particle filter to track the pose of the robot using particles that defining a probability of pose of the robot and a particle tuner to update the particles of the robot based on particles of neighboring robot. Upon receiving data indicative of relative pose between a pose of the robot and a pose of a neighboring robot, and particles of the neighboring robot, the particle tuner pairs an arbitrarily sampled particle of the robot with an arbitrarily sampled particle of the neighboring robot, determines a weight of the paired particles in reverse proportion to an error between a relative pose defined by the paired particles and the relative pose between the robot and the neighboring robot, and updates the particles of the robot in accordance to the weights of corresponding paired particles.

20 Claims, 19 Drawing Sheets

(56) References Cited

U.S. PATENT DOCUMENTS

| | | | |
|---|---|---|---|
| 2005/0234679 A1* | 10/2005 | Karlsson | G05D 1/0248 |
| | | | 702/181 |
| 2006/0129276 A1* | 6/2006 | Watabe | G05D 1/0274 |
| | | | 700/245 |
| 2008/0065267 A1* | 3/2008 | Hong | B25J 9/0003 |
| | | | 700/245 |
| 2008/0086236 A1* | 4/2008 | Saito | G06N 3/008 |
| | | | 700/245 |
| 2008/0119961 A1* | 5/2008 | Myeong | G05D 1/0274 |
| | | | 700/262 |
| 2009/0024251 A1* | 1/2009 | Myeong | G05D 1/0246 |
| | | | 700/259 |
| 2017/0276501 A1* | 9/2017 | Wise | G01C 21/20 |
| 2018/0176735 A1* | 6/2018 | Schuller | G01C 21/20 |
| 2018/0253108 A1* | 9/2018 | Heinla | G05D 1/0251 |
| 2018/0307941 A1* | 10/2018 | Holz | B66F 9/00 |
| 2018/0311822 A1* | 11/2018 | Kaminka | B25J 11/008 |

\* cited by examiner

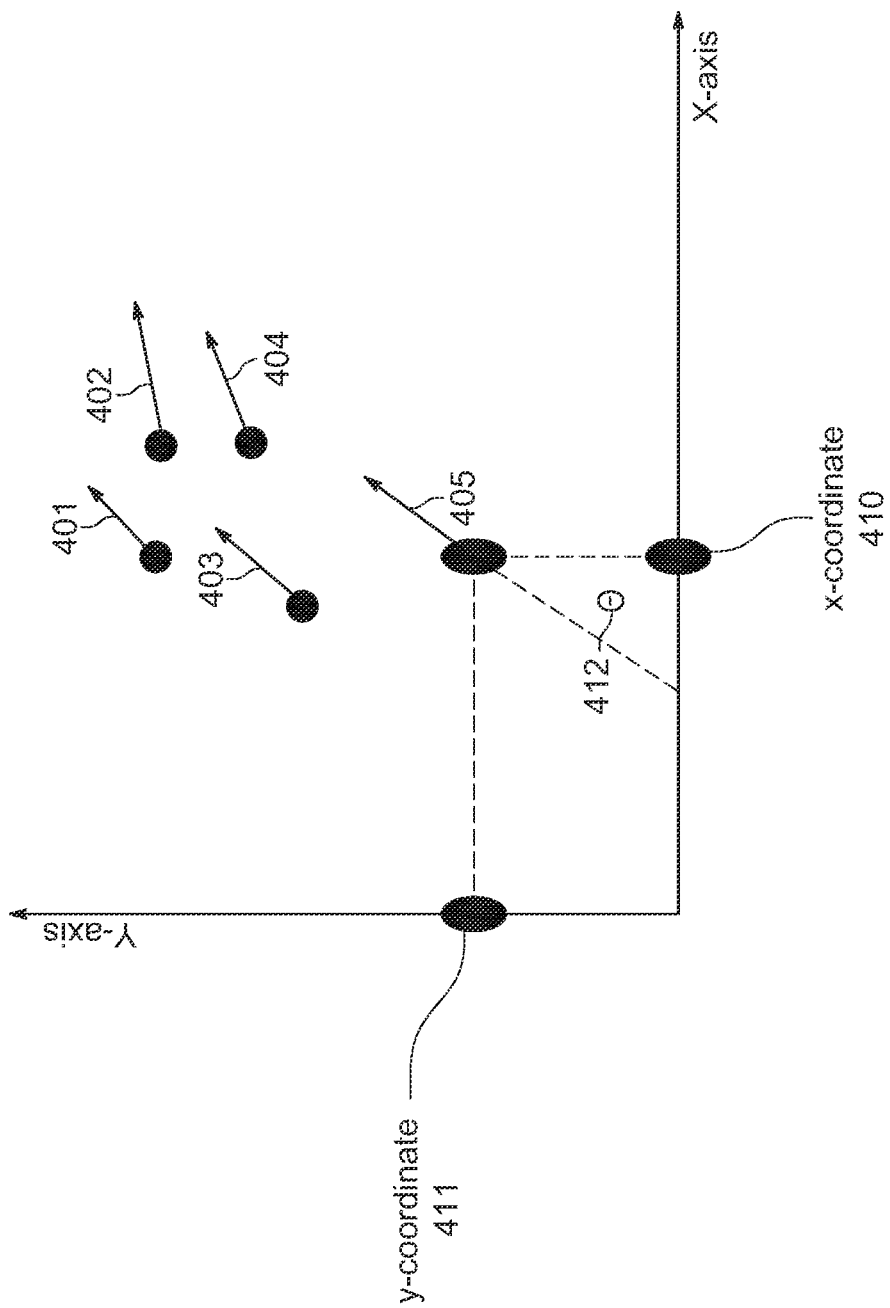

| Robot A's Pose Posterior Update |
|---|

1: Inputs: Particle sets $\mathcal{X}^A = \{\hat{x}_k^A\}_{k=1}^K$, $\mathcal{X}^B = \{\hat{x}_k^B\}_{k=1}^K$
2: Inputs: Relative range $r$ and bearing-heading $\phi$
3: Initialize $\tilde{\mathcal{X}}^A = \mathcal{A} = \emptyset$
4: for $l = 1 : L$ do
5:     Uniformly sample $\tilde{x}_l^A \sim \mathcal{X}^A$
6:     Uniformly sample $\tilde{x}_l^B \sim \mathcal{X}^B$
7:     Compute $w_l \propto p(r, \phi \mid \tilde{x}_l^A, \tilde{x}_l^B)$
8:     Update $\mathcal{A} = \mathcal{A} \cup \{(\tilde{x}_l^A, w_l)\}$
9: Normalize $w_l \leftarrow \frac{w_l}{\sum_{l=1}^L w_l}$
10: for $l = 1 : L$ do
11:     Draw $i$ with probability $w_i$
12:     Update $\tilde{\mathcal{X}}^A = \tilde{\mathcal{X}}^A \cup \tilde{x}_i^A$
13: return $\tilde{\mathcal{X}}^A$

FIG. 7

SYSTEM AND METHOD FOR PROBABILISTIC MULTI-ROBOT POSITIONING

TECHNICAL FIELD

The invention relates generally to a mobile robot, and, more particularly, to probabilistic multi-robot positioning.

BACKGROUND

One of the most essential prerequisites behind a successful task execution of a team of robots is to accurately estimate and track robots' poses. A general problem of robot positioning includes estimating pose of a robot based on measurements from sensors indicative of motion of the robot, such as odometry, sensors providing environment measurements, such as visual camera, depth camera, lidar, and, possibly, some external information. The robot positioning is at the core of nearly all robotics applications.

Positioning of a single robot has received tremendous attention with numerous systems, algorithms and use cases. Recently, the scenario where multiple robots collaboratively perform a task started to gain interest. Positioning of robots in a multi-robot system is advantageous. A naïve approach in positioning of multiple robots is to have each robot perform single-robot positioning. However, since the robots are already enabled to exchange information with the aim to collaboratively execute some task, why not then have them collaboratively perform positioning as well. That is, each robot may position itself using not only its own odometry and environment measurements, but also information received from other robots. The advantages of this approach may include more accurate positioning, faster convergence of estimation, and robustness.

Some methods in multi-robot positioning aim to reduce odometry errors using robot cooperation. A common framework includes instructing a set of robots to be stationary while the remaining robots move so that the robots in one group measure the motion of the robots in the other group and refine odometry measurements. However, those methods do not fuse odometry with environment measurements, which can be a limitation. In addition, the error in the refined odometry estimates still accumulates over time, which eventually leads to incorrect pose estimates.

In other cooperative positioning methods, robots exchange all measurements they have collected between their two consecutive rendezvous. Those measurements are usually odometry and laser scans. One drawback of this approach is an excessive communication bandwidth required to support exchange of huge amount of data. In addition, robots need to store a large amount of data, which requires large memory storage.

Some methods, e.g., a method described by Fox et al. in a Non-Patent Literature (NPL) "A Probabilistic Approach to Collaborative Multi-Robot Localization" a robot infers its pose probabilistically by fusing its own odometry and environment measurements with the relative pose measurements and pose particles of the other robot. The robots exchange pose particles and perform relative pose measurements at their random rendezvous. The information fusion is done within the Bayesian inference framework and uses density trees to estimate robot's pose from its particles. However, a complexity of this method is higher than a complexity of a single-robot positioning.

To reduce complexity of density trees based position estimation, other methods use different particle updating scheme in lieu of using the density trees. For example, a method of Prorok et al. described in an NPL "A reciprocal sampling algorithm for lightweight distributed multi-robot localization" uses the weight computation of the particles that requires evaluating relative pose distribution for all pairs of particles from the two robots involved in rendezvous. However, computational complexity of this method is $O(K2)$, where K is the number of particles. Another method of Prorok described in "Low-cost collaborative localization for large-scale multi-robot systems" reduces computational complexity to $O(KS)$ by clustering K particles into S clusters. However, this computational complexity is still more than desired. In addition, this method may fail to provide performance guaranties of probabilistic pose estimation.

SUMMARY

It is an objective of some embodiments to estimate a pose of a robot probabilistically using a particle filter. Particle filter represents a pose of a robot using a set of particles. The pose of a robot includes one or combination of location and orientation of the robot. Each particle defines a probability of a value of the current pose of the robot.

It is another objective of some embodiments to disclose a probabilistic multi-robot positioning system and method wherein robots exchange their particles upon a rendezvous. Notably, this approach does not require raw measurements of the sensors of each robot to be stored and exchanged at a rendezvous. Advantageously, each robot can fuse measurements of its corresponding sensor as soon as it gets them into updated particles that represent its pose. At the rendezvous, robots exchange particles leading to a relatively mild requirement on communication bandwidth size. In addition, this approach allows to establish connection only when the robots come in proximity, e.g., in line of sight of each other. This allows to reduce a requirement on communication coverage that can be achieved with a low power transceiver, such as those implementing Bluetooth standard.

It is another objective of some embodiments to provide such a probabilistic multi-robot positioning method that reduce a computational complexity, while ensuring performance guaranties provided by probabilistic estimation.

Some embodiments are based on realization that a particle filter solves a Bayesian inference problem, thus the multi-robot pose fusion should also follow the principles of Bayesian inference to guarantee the performance of the particle filter. However, the comparison of particles of different robots is pairwise, i.e., particles are grouped in pairs and two particles of each pair are compared with each other to update a pose of a robot. However, when pairing the particles is deterministic, such a pairing can undermine performance guaranties provided by Bayesian inference.

For example, all particles of one robot can be compared with all particles of another robot. Such an exhaustive pairing is deterministic, but accidently follows the principles of Bayesian inference when all information of hypotheses is available for probability estimation. However, such a comparison results in computational complexity $O(K^2)$, where K is the number of particles. A deterministic attempt to deviate from exhaustive pairing violates the principles of Bayesian inference. For example, ad-hoc clustering and comparison of particles of each cluster can reduce the computational complexity, but violates the principles of Bayesian inference, because clustering is deterministic.

Some embodiments are based on realization that random pairing of particles of different robots during probabilistic multi-robot positioning can reduce computational complexity to O(K), where K is the number of randomly selected pairs of particles while ensuring the probabilistic guarantees of particle filter. Indeed, random pairing is probabilistic and follows the principles of Bayesian inference to guarantee performance of the particle filter. In addition, random pairing is also simple, computationally efficient, and suitable for parallel computing.

To that end, some embodiments, upon rendezvous of a robot with another neighbor robot, compare arbitrarily paired particles of the robots to update the weights of the particles and ultimately the pose of the robot. As used herein, arbitrarily paired particles are sampled arbitrarily, i.e., not deterministically. Such an arbitrarily paring can be implemented using any random and/or a pseudo-random generator configured to select numbers from a set of numbers with equal probability, such that any number is equally likely to be selected from the set. In different implementations, particles are sampled uniformly randomly or non-uniformly randomly according to weights of the particle, such as a particle with a larger weight is more likely to be sampled than a particle with a smaller weight.

Accordingly, one embodiment discloses a system for estimating a pose of a robot, wherein the pose includes one or combination of a location of the robot and an orientation of the robot. The system includes an input interface configured to receive data indicative of a value of a relative pose between a current pose of the robot and a current pose of a neighboring robot, and indicative of values of particles of the neighboring robot, each particle of the neighboring robot defines a probability of a value of the current pose of the neighboring robot; a memory configured to store values of particles of the robot, each particle of the robot defines a probability of a value of the current pose of the robot, and store executable components including a particle filter configured to track the pose of the robot using a set of particles, each particle defines a probability of a value of the current pose of the robot; a particle tuner configured to pair an arbitrarily sampled particle of the robot with an arbitrarily sampled particle of the neighboring robot, determine a weight of the paired particles in reverse proportion to an error between a relative pose defined by the paired particles and the relative pose between the robot and the neighboring robot, and update the particles of the robot in accordance to the weights of corresponding paired particles; a processor configured to track, in response to a change of the pose of the robot, the pose of the robot using the particle filter, and to update, in response to receiving the data, the particles of the particle filter using the particle turner; and an output interface configured to output the current pose of the robot.

Another embodiment discloses a method for estimating a pose of a robot, wherein the pose includes one or combination of a location of the robot and an orientation of the robot, wherein the method uses a processor coupled with stored instructions implementing the method, wherein the instructions, when executed by the processor carry out steps of the method, includes receiving data indicative of a value of a relative pose between a current pose of the robot and a current pose of a neighboring robot, and indicative of values of particles of the neighboring robot, each particle of the neighboring robot defines a probability of a value of the current pose of the neighboring robot; tracking the pose of the robot using a set of particles, each particle defines a probability of a value of the current pose of the robot; pairing an arbitrarily sampled particle of the robot with an arbitrarily sampled particle of the neighboring robot, determining a weight of the paired particles in reverse proportion to an error between a relative pose defined by the paired particles and the relative pose between the robot and the neighboring robot, and updating the particles of the robot in accordance to the weights of corresponding paired particles.

Yet another embodiment discloses a non-transitory computer readable storage medium embodied thereon a program executable by a processor for performing a method, the method includes receiving data indicative of a value of a relative pose between a current pose of the robot and a current pose of a neighboring robot, and indicative of values of particles of the neighboring robot, each particle of the neighboring robot defines a probability of a value of the current pose of the neighboring robot; tracking the pose of the robot using a set of particles, each particle defines a probability of a value of the current pose of the robot; pairing an arbitrarily sampled particle of the robot with an arbitrarily sampled particle of the neighboring robot, determining a weight of the paired particles in reverse proportion to an error between a relative pose defined by the paired particles and the relative pose between the robot and the neighboring robot, and updating the particles of the robot in accordance to the weights of corresponding paired particles.

BRIEF DESCRIPTION OF THE DRAWINGS

FIG. 4A is an illustration of particle cloud in a reference system of FIG. 2A.

FIG. 7 is a pseudo-code of the cooperative positioning used by one embodiment.

DETAILED DESCRIPTION

Figure 1A:
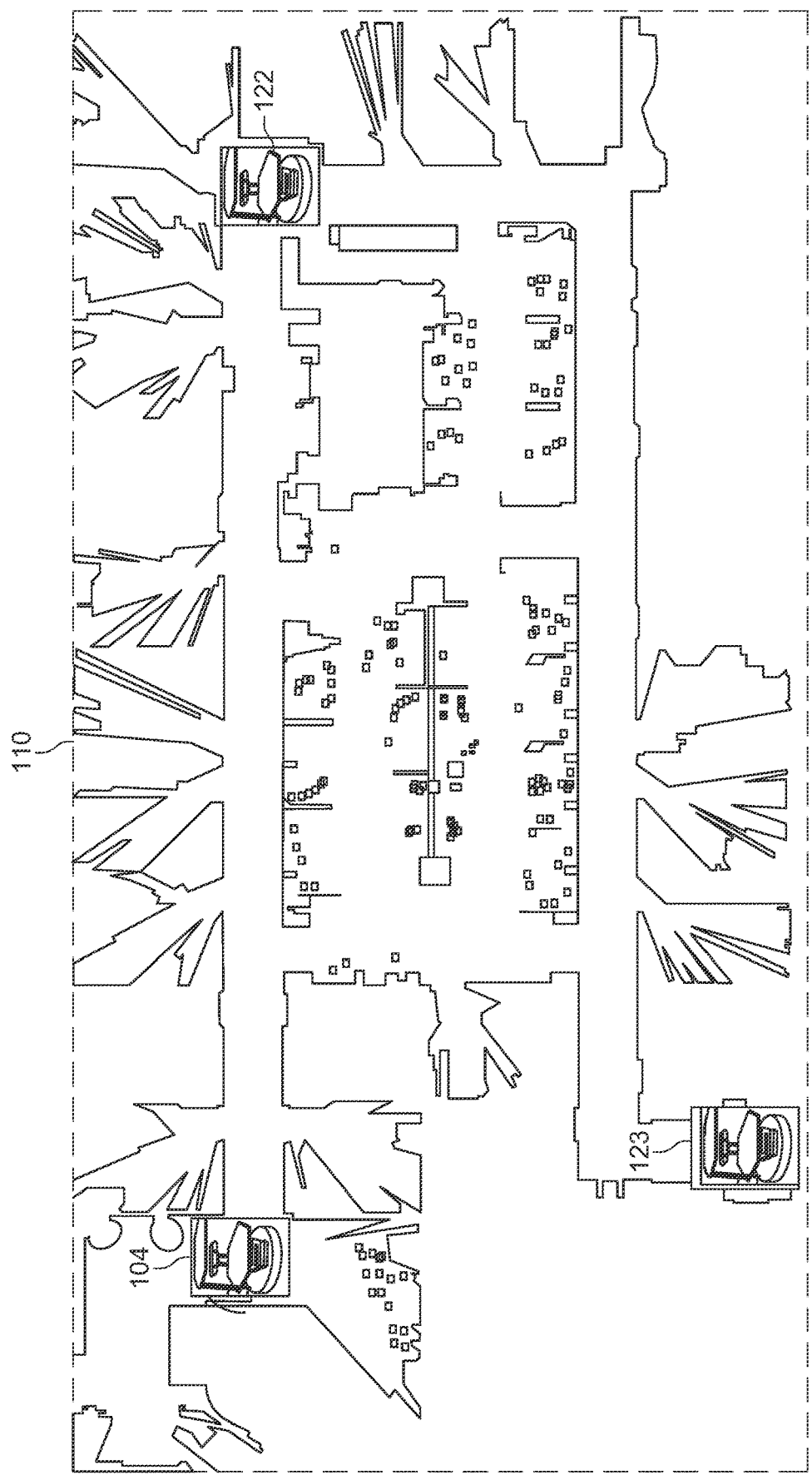
FIG. 1A shows a schematic illustrating a scenario where multiple robots travel in an indoor area to perform multi-robot positioning according to some embodiments.

FIG. 1A shows a schematic illustrating a scenario where multiple robots travel in an indoor area to perform multi-robot positioning according to some embodiments. In one embodiment, 2D occupancy grid map is known and/or made available to the robots. Additionally, or alternatively, some embodiments perform simultaneous localization and mapping (SLAM) by constructing or updating a map of an unknown environment while simultaneously keeping track of robot's poses.

In an example shown in FIG. 1A, three robots 121, 122 and 123 are in common area 110 and cooperatively execute a certain task. One of the main prerequisites for a successful task execution is to enable robots the ability to localize themselves in the area. A naive approach is to let each robot localize itself using one of many single-robot localization algorithms from prior art. However, robots may cooperate while performing localization with the potential benefit of obtaining more accurate location estimates. To that end, some embodiments disclose multi-robot positioning for cooperative robot localization.

Figure 1B:
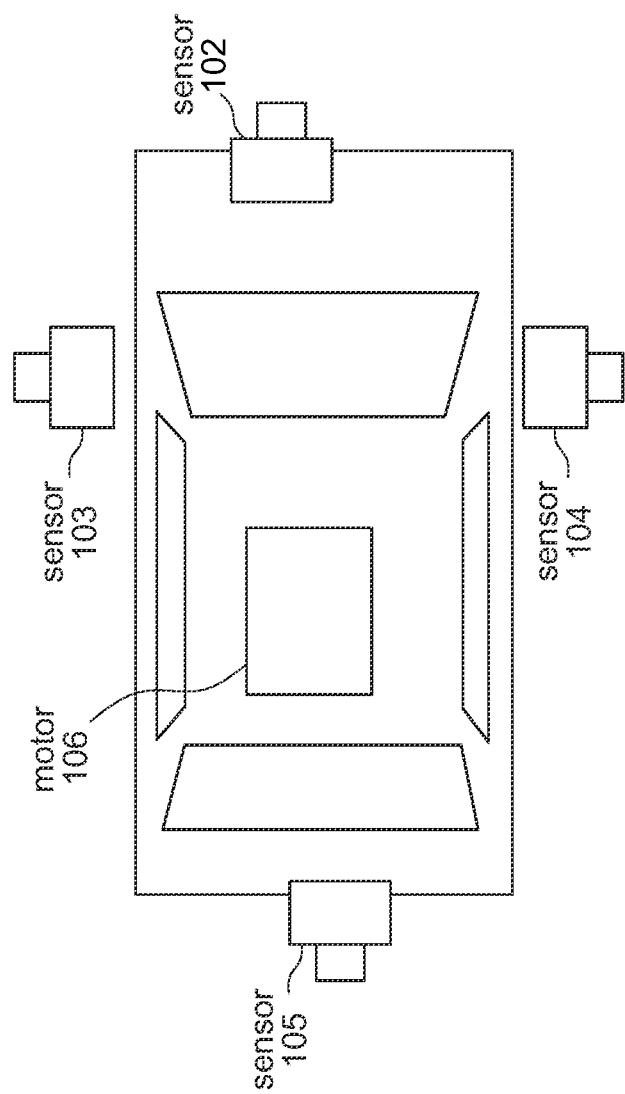
FIG. 1B shows a schematic of a robot utilizing cooperative robot localization using principles of some embodiments.
Figure 1C:
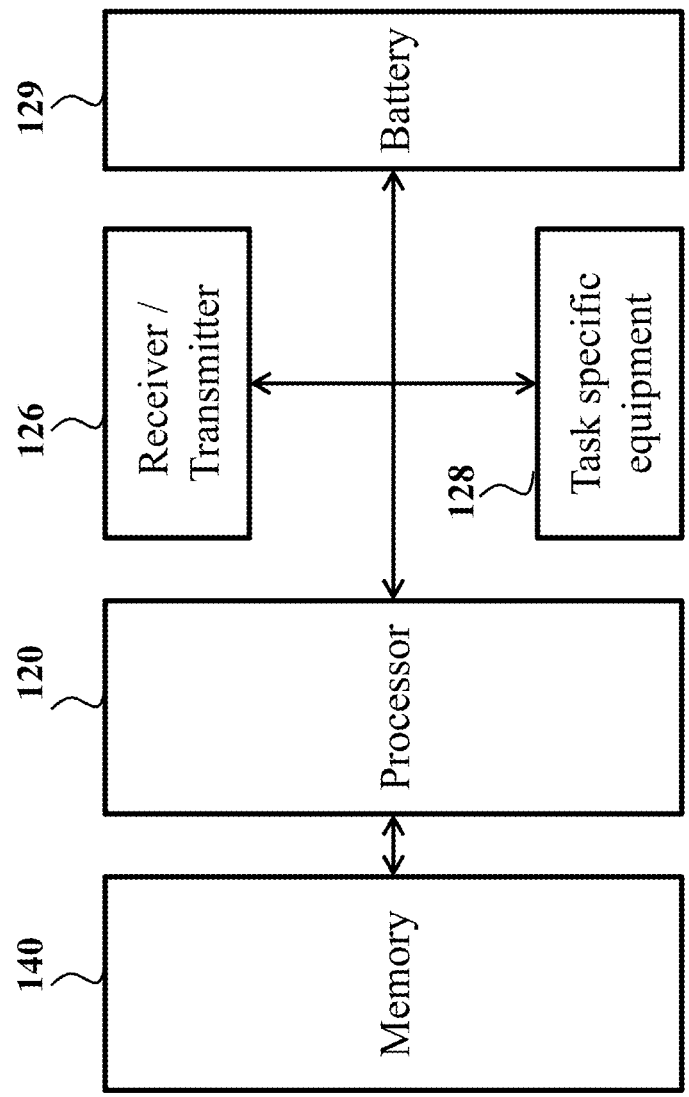
FIG. 1C shows a schematic of various components of the robot of FIG. 1B.

FIG. 1B shows a schematic of a robot utilizing cooperative robot localization using principles of some embodiments. FIG. 1C shows a schematic of various components of the robot of FIG. 1B. A robot is a fully or partially autonomous entity containing motor 106 so that it can autonomously move in an area, set of sensors 102, 103, 104, and 105 to take a variety of measurements, memory 140 to store measurements and other quantities, processor 120 to execute a variety of algorithms, transceiver 126, i.e., a receiver and a transmitter, to communicate with other robots and devices, and a battery 129 which provides electric power to the robot and all its devices. The robot may also include equipment 128, e.g., a gripper, for performing various tasks of the robot.

For example, a robot is equipped with a sensor for environment sensing, such as a low-cost structured light sensor, and a sensor for recording robot's motions, such as odometric sensors. To enable cooperation, robots need to be able to detect the presence of other robots. This could be achieved in multiple ways. For example, in one scenario, a facial of a robot is marked with visible markings, while the other robot is equipped with a visual camera to detect the presence of the checkerboard and measure the relative pose between robots (i.e., relative range, bearing and heading).

The robots are configured to move in an area, either by random wander or according to some instructions, and occasionally come relatively close to each other. Once the rendezvous is detected by one or both robots, the robots exchange a relatively small amount of information via a wireless communication link. Each robot fuses the received information with its own information locally, using its own computational resources. In other words, the information fusion happens at each robot independently, so that a central server is not needed.

More specifically, each robot traveling in an area localizes itself in the map of that area using measurements from environment and motion sensing. The location estimate is obtained using a conventional single-robot PF-based positioning and represented with a certain number of pose particles. Upon the rendezvous, the two robots exchange their particles. This is in contrast with other multi-robot SLAM, where robots exchange all environment and motion measurements collected between two consecutive rendezvous events. In addition to particles, the robot measuring the relative pose between robots sends that measurement to the other robot. Each robot then fuses particles representing its pose prior to the rendezvous with the particles received from the other robot and relative pose measurement between the two robots. The result of the information fusion done locally on each robot is a set of updated pose particles. The robots then continue to travel in the area and perform pose estimation on their own until they meet again.

Some embodiments, upon rendezvous of a robot with another neighbor robot, compare arbitrarily paired particles of the robots to update the weights of the particles and ultimately the pose of the robot. As used herein, arbitrarily paired particles are sampled arbitrarily, i.e., not deterministically. Such an arbitrarily paring can be implemented using any random and/or a pseudo-random generator configured to select numbers from a set of numbers with equal probability, such that any number is equally likely to be selected from the set. In different implementations, particles are sampled uniformly randomly or non-uniformly randomly according to weights of the particle, such as a particle with a larger weight is more likely to be sampled than a particle with a smaller weight.

Figure 1D:
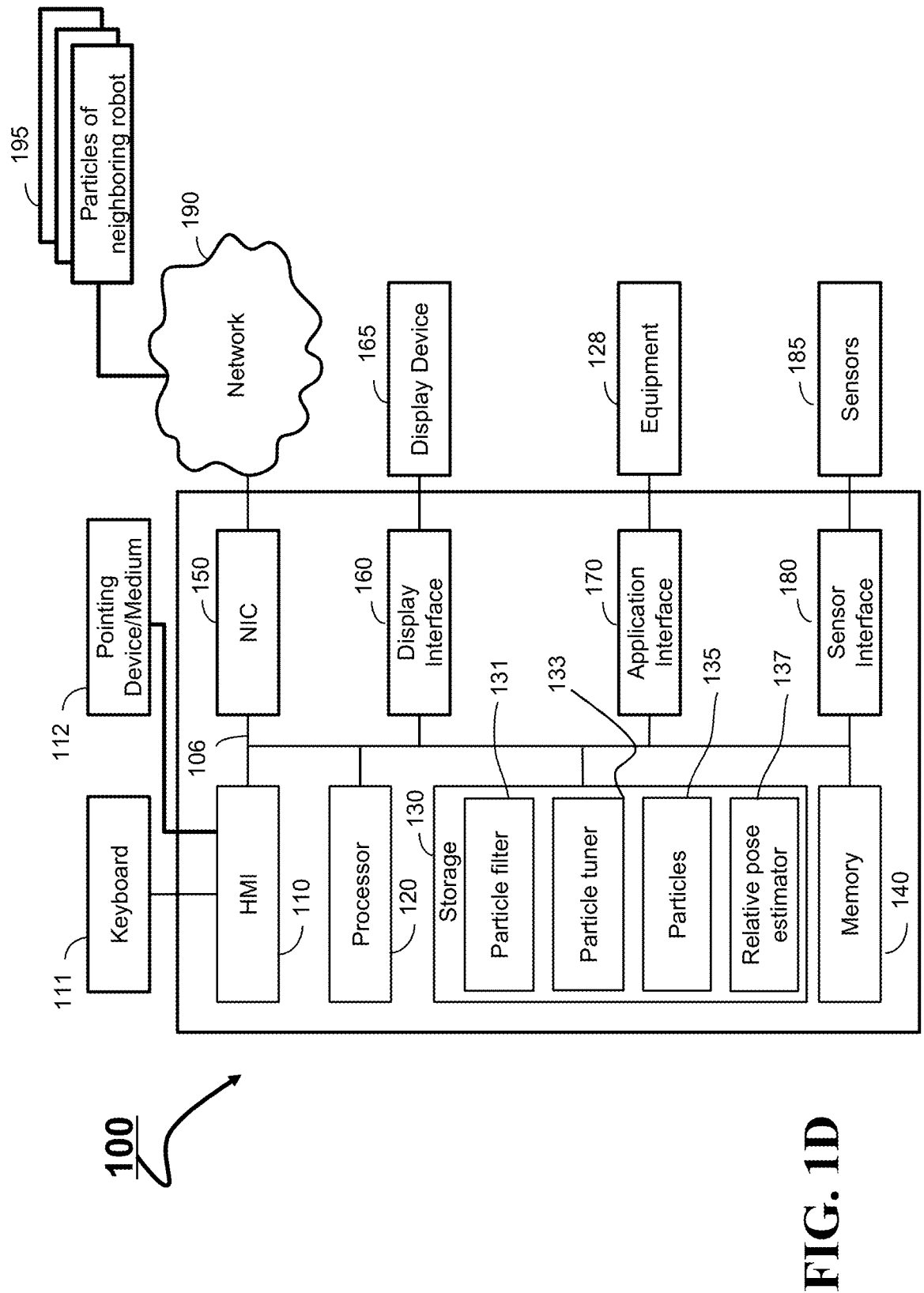
FIG. 1D shows a block diagram of a system 100 for estimating a pose of a robot in accordance with some embodiments.

FIG. 1D shows a block diagram of a system 100 for estimating a pose of a robot in accordance with some embodiments. As used herein, the pose includes one or combination of a location of the robot and an orientation of the robot. The system 100 implements a probabilistic multi-robot positioning method that reduce a computational complexity, while ensuring performance guarantees provided by probabilistic estimation.

The system 100 includes a processor 120 configured to execute stored instructions, as well as a memory 140 that stores instructions that are executable by the processor. The processor 120 can be a single core processor, a multi-core processor, a computing cluster, or any number of other configurations. The memory 140 can include random access memory (RAM), read only memory (ROM), flash memory, or any other suitable memory systems. The processor 120 is connected through a bus 106 to one or more input and output devices. These instructions implement a method for probabilistic multi-robot positioning.

To that end, the system 100 includes a particle filter 131 configured to track the pose of the robot using a set of particles. Each particle defines a probability of a value of the current pose of the robot. The particles can be determined and/or updated using measurements of the sensors of the robot. The particles represent pose with respect to the measurements of the sensors. This allows the robot to avoid storing raw measurements of the sensor, and store only the particles 135, which is memory efficient. For example, a storage device 130 can be adapted to store the particles 135 and/or the particles of other neighboring robots. The storage device 130 can be implemented using a hard drive, an optical drive, a thumb drive, an array of drives, or any combinations thereof.

In some implementations, the particle filter 131 can update the pose of the robot using only the measurements of the sensors of the robot. However, the system 100 also includes a particle tuner 133 configured to update the particles 135 using external information, i.e., other and/or in addition to the robot's sensors measurements. Specifically, particle tuner 133 is based on recognition that if particles of the robot correctly represent the current pose of the robot and particles of the neighboring robot correctly represent the current pose of the neighboring robot, a pair of the particles from each robot should correctly represent a relative pose of the robot. Such a relative pose determined by a pair of particles can be compared with a relative pose determined by other means and the result of the comparison is indicative of the correctness of the particles in the representation of the current pose. For example, a larger difference between a relative pose determined by a pair of particles and a relative pose determined by other means indicates a lower probability that the particles represent the poses of the robot correctly.

For example, in some implementations, the system 100 can optionally include a relative pose estimation component 137 that can use sensor information to determine the relative pose between two robots. The sensor information can have various forms and provide reliable estimation of the relative pose. For example, in one scenario, a facial of a neighboring robot is marked with visible markings, while the robot is equipped with a visual camera to detect the presence of the visible markings, e.g., checkerboard and, measure the relative pose between robots (i.e., relative range, bearing and heading). Additionally, or alternatively, the system 100 can receive relative pose estimation from a neighboring robot.

Some embodiments are based on realization that a particle filter solves a Bayesian inference problem, thus the multi-robot pose fusion should also follow the principles of Bayesian inference to guarantee the performance of the particle filter. However, the comparison of particles of different robots is pairwise, i.e., particles are grouped in pairs and two particles of each pair are compared with each other to update a pose of a robot. However, when pairing the particles is deterministic, such a pairing can undermine performance guaranties provided by Bayesian inference.

Some embodiments are based on realization that random pairing of particles of different robots during probabilistic multi-robot positioning can reduce computational complexity to $O(K)$, where K is the number of randomly selected pairs of particles while ensuring the performance guarantees of particle filter. Indeed, random pairing is probabilistic and follows the principles of Bayesian inference to guarantee performance of the particle filter. In addition, random pairing is also simple, computationally efficient, and suitable for parallel computing.

To that end, a particle tuner is configured to pair an arbitrarily sampled particle of the robot with an arbitrarily sampled particle of the neighboring robot, determine a weight of the paired particles in reverse proportion to an error between a relative pose defined by the paired particles and the relative pose between the robot and the neighboring robot, and update the particles of the robot in accordance to the weights of corresponding paired particles. As used herein, arbitrarily paired particles are sampled arbitrarily, i.e., not deterministically. Such an arbitrarily paring can be implemented using any random and/or a pseudo-random generator configured to select numbers from a set of numbers with equal probability, such that any number is equally likely to be selected from the set. In different implementations, particles are sampled uniformly randomly or non-uniformly randomly according to weights of the particle, such as a particle with a larger weight is more likely to be sampled than a particle with a smaller weight.

A network interface controller 150 is adapted to connect the system 100 through the bus 106 to a network 190. Through the network 190, using transceiver 126, the system can transmit the particles of the robot to the neighboring robot and/or request the neighboring robot to transmit its particles. In addition, the system 100 includes a sensor interface 180 to request the measurements from the sensors of the robot and/or to detect rendezvous with the neighboring robot when the robot is in proximity to the neighboring robot to request the neighboring robot to transmit its particles.

In some implementations, a human machine interface 110 within the system 100 connects the system to a keyboard 111 and pointing device 112, wherein the pointing device 112 can include a mouse, trackball, touchpad, joy stick, pointing stick, stylus, or touchscreen, among others. The system 100 includes an output interface configured to output the current pose of the robot. For example, the output interface can include a memory to render the pose of the robot and/or various interfaces to system benefiting from the estimated pose of the robot. For example, the system 100 can be linked through the bus 106 to a display interface 160 adapted to connect the system 100 to a display device 165, wherein the display device 165 can include a computer monitor, camera, television, projector, or mobile device, among others. The system 100 can also be connected to an application interface 170 adapted to connect the system to the equipment 128 for performing a robot specific tasks based on position of the robot.

Particle Filter

In various embodiments, the particle filter 131 is configured to estimate the pose of the robot. The following provides a brief overview of the particle filter (PF)-based positioning algorithm used by some embodiments additionally or alternatively with multi-robot data fusion.

Figure 2A:
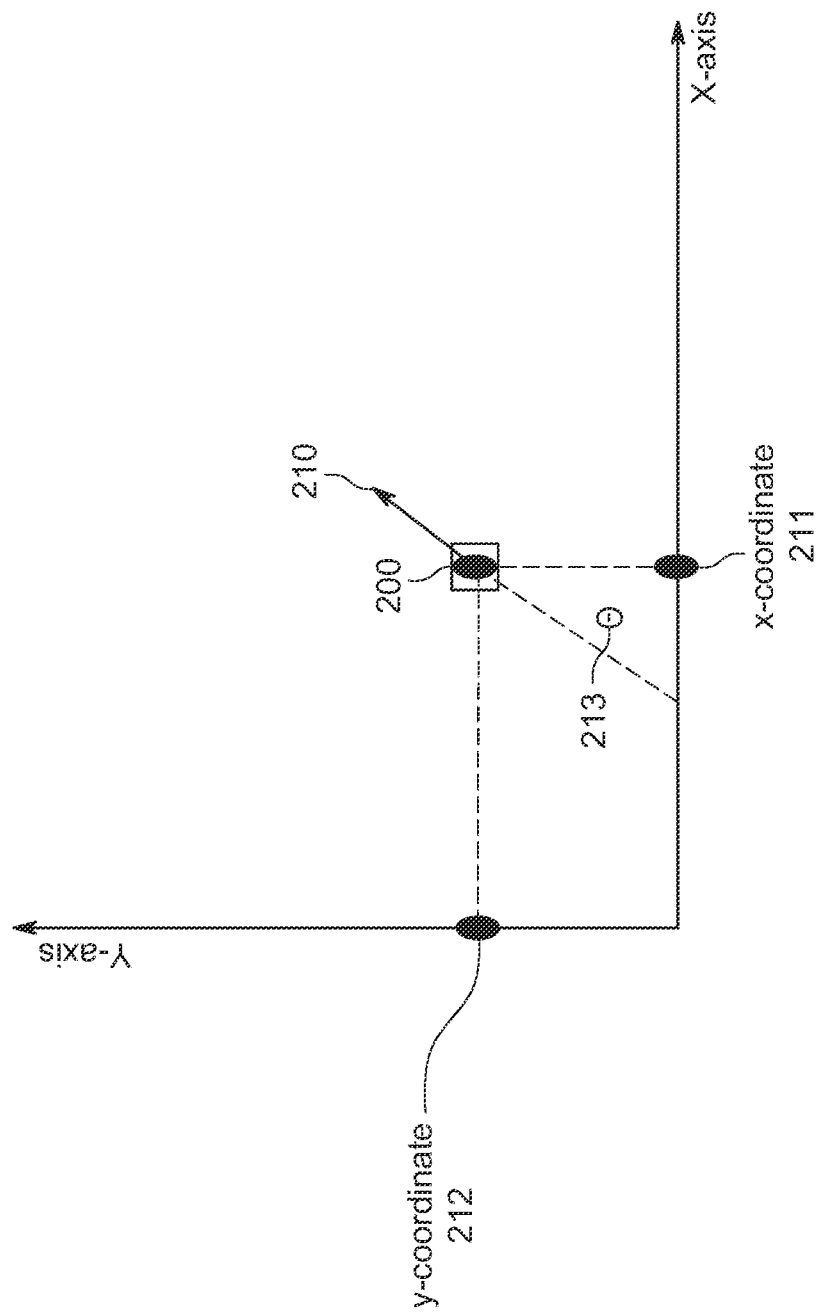
FIG. 2A is an illustration of a pose of a robot in a reference system used by some embodiments.

FIG. 2A is an illustration of a pose of a robot in a reference system used by some embodiments. A pose 210 estimation of a robot 200 in a 2D environment is concerned with estimating robot's 2D coordinates (x, y) 211 and 212 and orientation θ213 with respect to the coordinate system associated with the environment. The 2D coordinates and orientation at time t are collected into a pose vector $x_t = [x_t, y_t, \theta_t]^T$, where the operator T denotes the vector/matrix transpose.

Figure 2B:
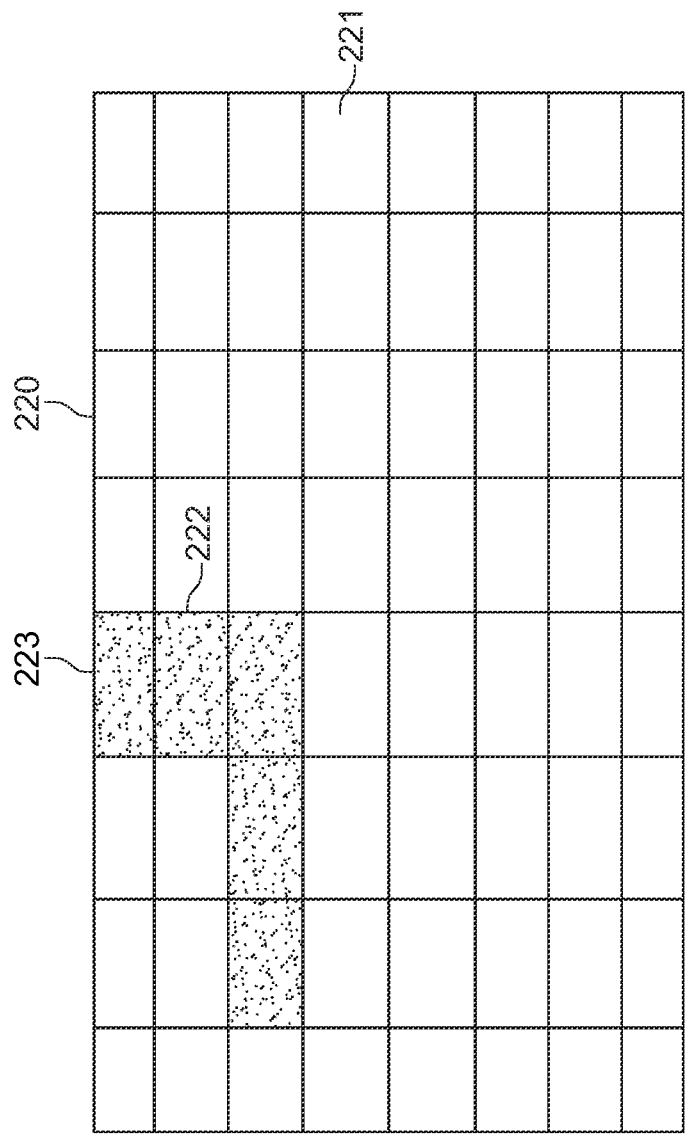
FIG. 2B is an example of an occupancy grid map used by some embodiments.

FIG. 2B is an example of an occupancy grid map used by some embodiments. The knowledge about the environment is represented with an occupancy grid map $m \in \{0,1\}$, obtained by dividing the area into N bins, such that $m_i=1$ in case the ith bin is occupied, or $m_i=0$, otherwise. In this example, an unknown area 220 is divided into 8 by 8 bins where a bin is either occupied 222 or unoccupied 221. For example, multiple consecutive bins that are occupied indicate presence of a wall 223.

In some implementations, at least two types of measurements, i.e., environmental and motion measurements, are collected by sensors 102-105 as the robot travels through the environment. The environmental measurements can be produced by, e.g., a laser scan at time t that delivers ranging measurements representing distances from the robot to the obstacles seen within its field of view. These measurements are collected into vector $z_t$. The ranging measurements $z_t$ are probabilistically modeled with $p(z_t|x_t, m)$, representing probability of obtaining a realization of $z_t$ for a given pose $x_t$ and map m. Intuitively, the aim is to give a large probability mass to the measurements consistent with a given robot pose and map.

The measurements associated with robot motion are collected into vector $u_t$, representing the odometric sensor measurements within the time interval (t−1, t]. The odometric sensors can be wheel encoders, in which case we talk about true measurements, or control inputs issued to the robot which are treated as measurements for the sake of pose estimation. The robot motion model is probabilistically described with $p(x_t|x_{t-1}, u_t)$, representing a probability of finding a robot at some pose realization $x_t$, given its pose $x_{t-1}$ at time $t-1$, and odometry measurement $u_t$. Intuitively, the pose realizations of $x_t$ not consistent with the pose at time $t-1$ and odometry measurements receive a relatively small probability mass.

Figure 3:
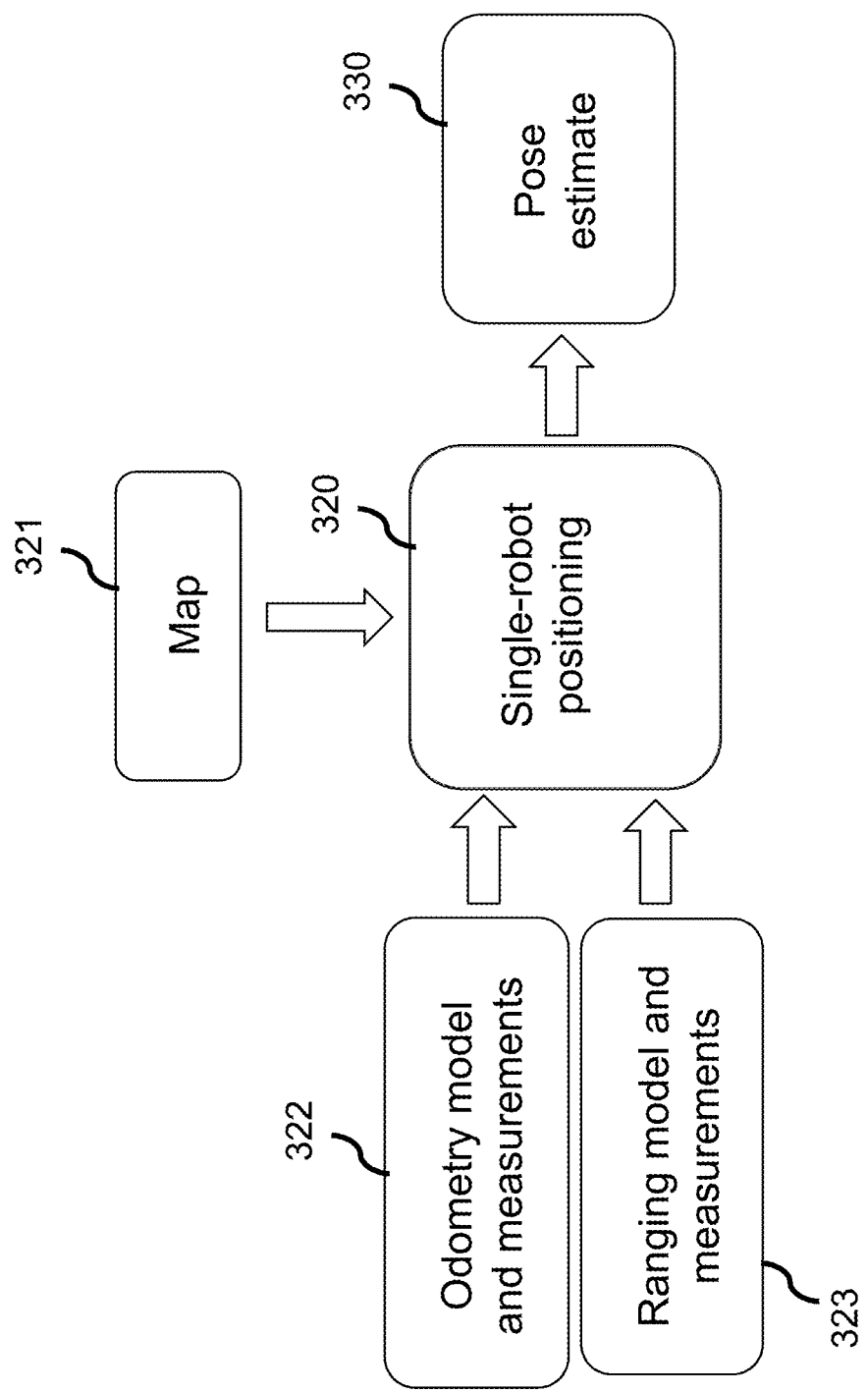
FIG. 3 shows a block diagram of a single robot pose estimation used by some embodiments.

FIG. 3 shows a block diagram of a single robot pose estimation 320 used by some embodiments. The pose estimation 320 takes as inputs the odometry model and measurements 322, ranging model and measurements 323, and map 321 of the environment, and produces an estimate of robot's pose 320.

In some embodiments, the pose estimation 320 is performed probabilistically by a particle filter 131 using Bayesian inference framework. The aim of robot pose estimation within the Bayesian inference framework is to infer the probability distribution of a robot pose $x_t$ at time t, given the map and all ranging and odometry measurements up to time t. That is, the objective is to find $$p(x_t|u_{1:t}, z_{1:t}, m) \triangleq p(x_t|u_1, \ldots, u_t, z_1, \ldots, z_t, m). \quad (1)$$

In addition, the inference of (1) needs be done sequentially, that is, the belief about robot's pose at time t should be updated from the belief of its pose at time $t-1$. This is conceptually done by employing the Bayes' filter, supplied with the motion $p(x_t|x_{t-1}, u_t)$ and ranging model $p(z_t|x_t, m)$. The Bayes' filter boils down to the Kalman filter in case of linear and Gaussian motion and ranging models. Otherwise, upon the linearization of those models, the Bayes' filter becomes the extended Kalman filter. More generally, to avoid model linearization, the Bayes' filter is implemented by particle filter (PF) according to some embodiments. The PF represents the probability distribution (1) with a certain number of possible pose realizations, called particles. That is the output 330 from pose estimation 320 is a set of pose particles.

FIG. 4A is an illustration of particle cloud in a reference system of FIG. 2A. A pose of the robot is represented with particles 401, 402, 403, 404, 405. Each particle has its own x-coordinate 410, y-coordinate 411, and orientation 412 defining the pose. Collectively, the particles 401, 402, 403, 404, 405 represent probabilistic distribution of the pose.

Figure 4B:
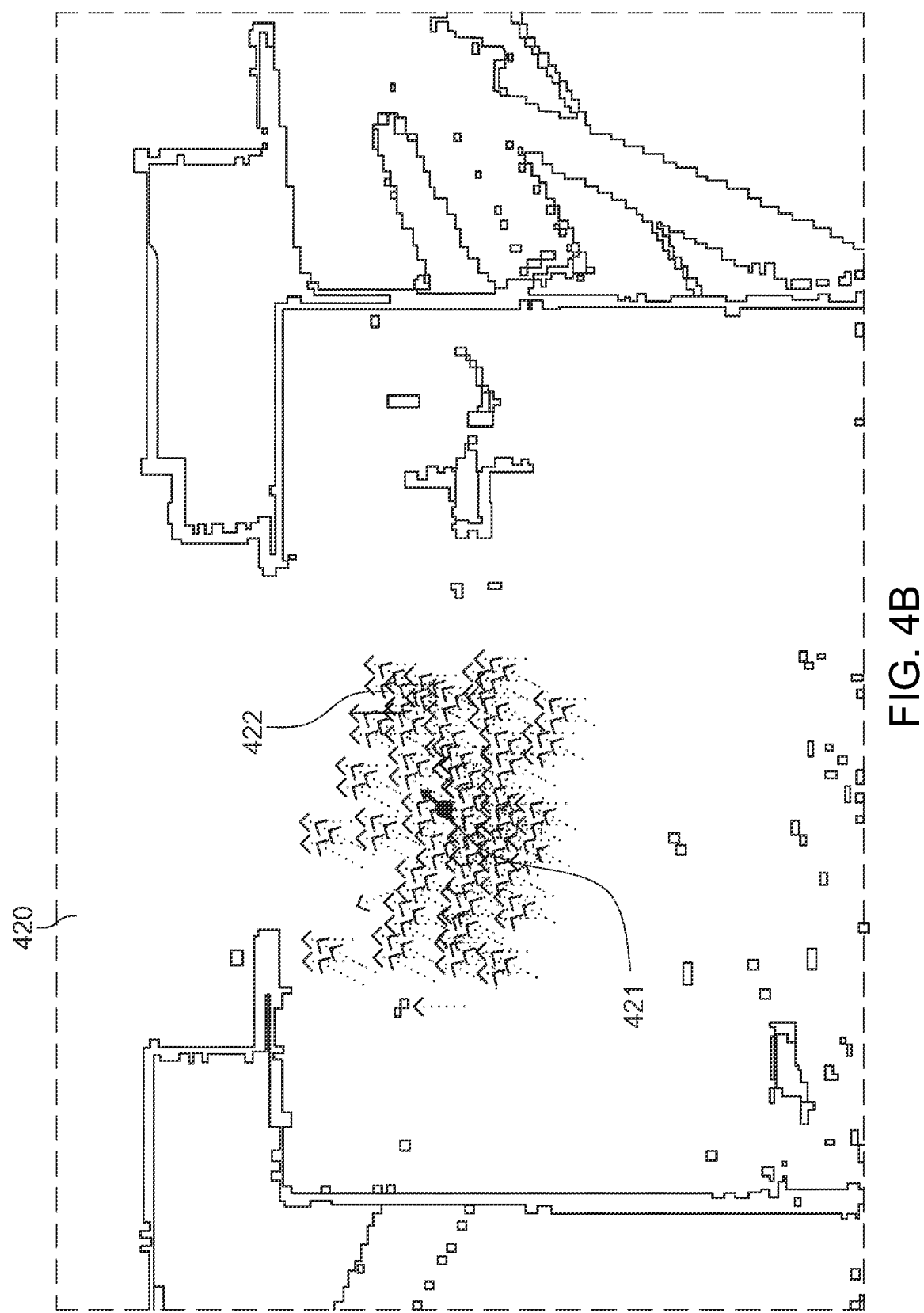
FIG. 4B is an illustration of particle cloud in an area according to some embodiments.

FIG. 4B is an illustration of particle cloud in an area according to some embodiments. Typically, many particles are used to represent the pose of the robot probabilistically. In the example of FIG. 4B, at some time instant t, where the pose of robot 421 within map 420 is represented with a particle cloud 422.

A particle filter can be thought of as approximating the belief of robot's pose at time t as $$p(x_t | u_{1:t}, z_{1:t}, m) \approx \frac{1}{K}\sum_{k=1}^{K} \delta(x - x_{t,k}), \quad (2)$$

where $\delta(\ )$ is the Dirac's delta function, K is the overall number of particles and $X_{t,k}$ are particles. Although the particle mean can serve as a final point estimate of the robot's pose, their spread (i.e., variance) suggests the confidence one may have in the pose estimate. As such, a fairly confined particles indicate high confidence, although that does not necessarily imply correct pose estimate.

In some implementations, particle filter is initialized with K particles, uniformly sampled from the area where the robot is present. Given the set of particles $\{x_{t-1,k}\}_{k=1}^{K}$ representing the robot's pose at time $t-1$ and odometry measurement $u_t$ obtained at time t, the robot motion model $p(x_t|x_{t-1}, u_t)$ is used to sample (tentative) particles $\{x'_k\}_{k=1}^{K}$. Each tentative particle $x'_k$ is associated with a weight $w_k$ computed from the ranging model and measurement $z_t$, $$w_k \propto p(z_t|x'_k, m) \quad (3)$$

and normalized so that $\Sigma_{k=1}^{K} w_k = 1$. The tentative particles are sampled according to $\{w_k\}_{k=1}^{K}$ to produce the particle set $\{x_{t,k}\}_{k=1}^{K}$, representing the robot's pose at time t.

Robot Rendezvous

In some embodiments, robots occasionally meet and exchange some information to aid cooperative pose estimation. In some implementations, the rendezvous occurs randomly or arranged by proper control of the robots. At the rendezvous of two robots, at least one robot has to be enabled to detect the presence of the other robot. In a two-robot scenario, one way to achieve this is to equip one robot with a visual tag and the other one with the RGB camera. Then, a computer vision algorithm looks for a tag in the RGB camera feed and, in case of a rendezvous, detects the presence of the other robot. Other approaches in attaining this requirement are possible. For example, in some implementations each robot emits a signature ultrasound signal. Thus, when two robots come close to each other, for example are at a distance of less than 10 meters, they can "hear" each other and detect each other identity from the received signature ultrasound signals.

After the robots detect they are in the vicinity of each other, one (or both robots) measure the relative range r and relative bearing and heading such that heading of one robot with respect to the heading of the other robot is φ. In one embodiment, the bearing φ is obtained from the RGB camera frames containing the identity tag of the other robot, while the distance r yields from the bearing measurement and ranging scan.

Figure 5A:
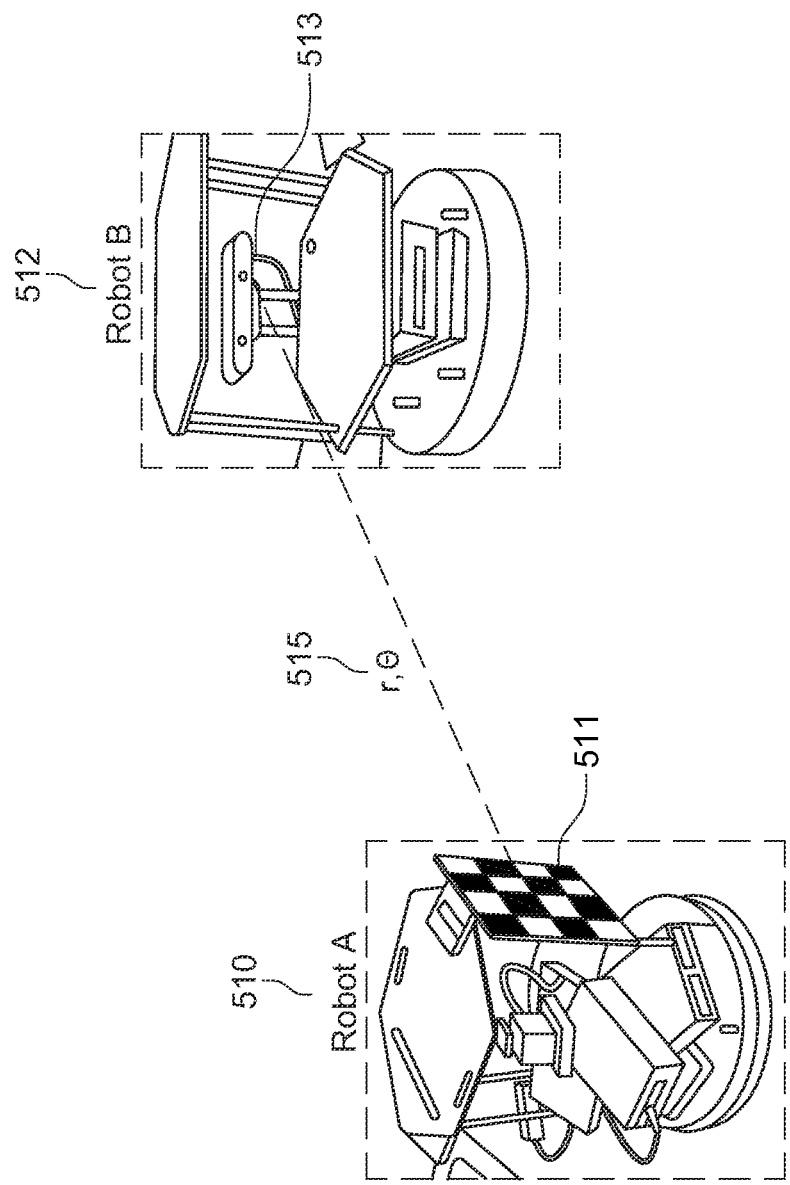
FIG. 5A is a schematic illustrating a rendezvous of two robots in one embodiment.

FIG. 5A is a schematic illustrating a rendezvous of two robots in one embodiment. In this example, a robot A 510 is equipped with a checkerboard 511 which serves as its visual tag. Then, when robot A 510 and robot B 512 are in close proximity and in orientation such that the camera 513 of robot B points toward the checkerboard of robot A, robot B detects the presence of robot A and measures their relative pose 515.

For example, in one embodiment, upon detecting robot A, the robot B performs relative pose measurements in two steps. First, the location (x,y,z) of the center of the checkerboard pattern is obtained from the point cloud created from the depth measurements provided by the RGBD sensor. Then, the relative pose estimation is performed by extracting the point cloud of the checkerboard corners and estimating the surface normal using OpenPCL method.

Figure 5B:
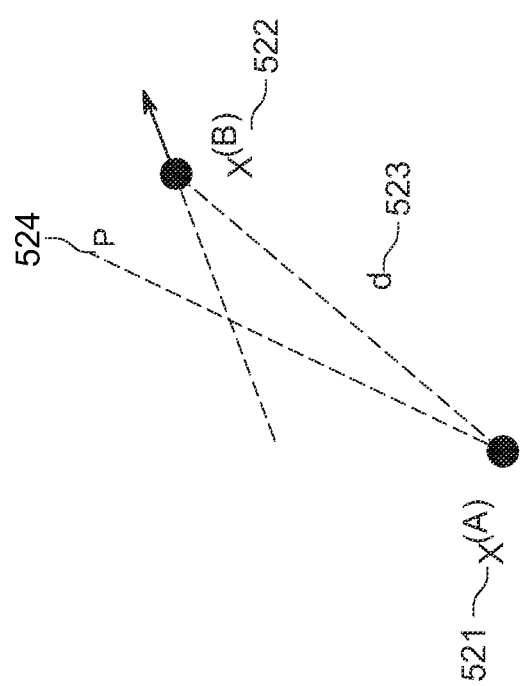
FIG. 5B is a schematic of a relative pose between two robots used by some embodiments.

FIG. 5B is a schematic of a relative pose between two robots used by some embodiments. To perform information fusion within the Bayesian framework, some embodiments specify a probabilistic model for the relative pose measurement, conditioned on the robots' poses. Formally, this model is captured with $p(r, \phi|x_t^A, x_t^B)$, where, referring to FIG. 5B, $x_t^A$ 521 and $x_t^B$ 522 denote poses of two robots at the rendezvous time t. For that purpose, the relative range r and bearing-heading measurement φ are independent and each has a Gaussian distributed error of zero mean and variance $\sigma_r^2$ and $\sigma_\phi^2$, respectively. That is, $$p(r, \phi | x_t^A, x_t^B) = \quad (4)$$

-continued $$p(r | x_t^A, x_t^B)p(\phi | x_t^A, x_t^B) = \mathcal{N}(r; d_t, \sigma_r^2)\mathcal{N}(\phi; \rho_t, \sigma_\phi^2),$$

where $\mathcal{N}(x; \mu, \sigma^2) = 1/\sqrt{2\pi\sigma^2}\exp(-(x-\mu)^2/2\sigma^2)$ is Gaussian distributed variable x, of mean μ and variance $\sigma^2$, while d 523 and ρ 524 are the relative range and bearing-heading corresponding to the poses $x_t^A$ and $x_t^B$. In general, the variances $\sigma_r^2$ and $\sigma_\phi^2$ can be calibrated from the measured data, or assessed based on the accuracy of the measurement method and resolution of the map m. As skilled artisan would recognize, the information fusion described below is not restricted by the choice of $p(r, \phi | x_t^A, x_t^B)$.

Particle Tuner

Figure 6A:
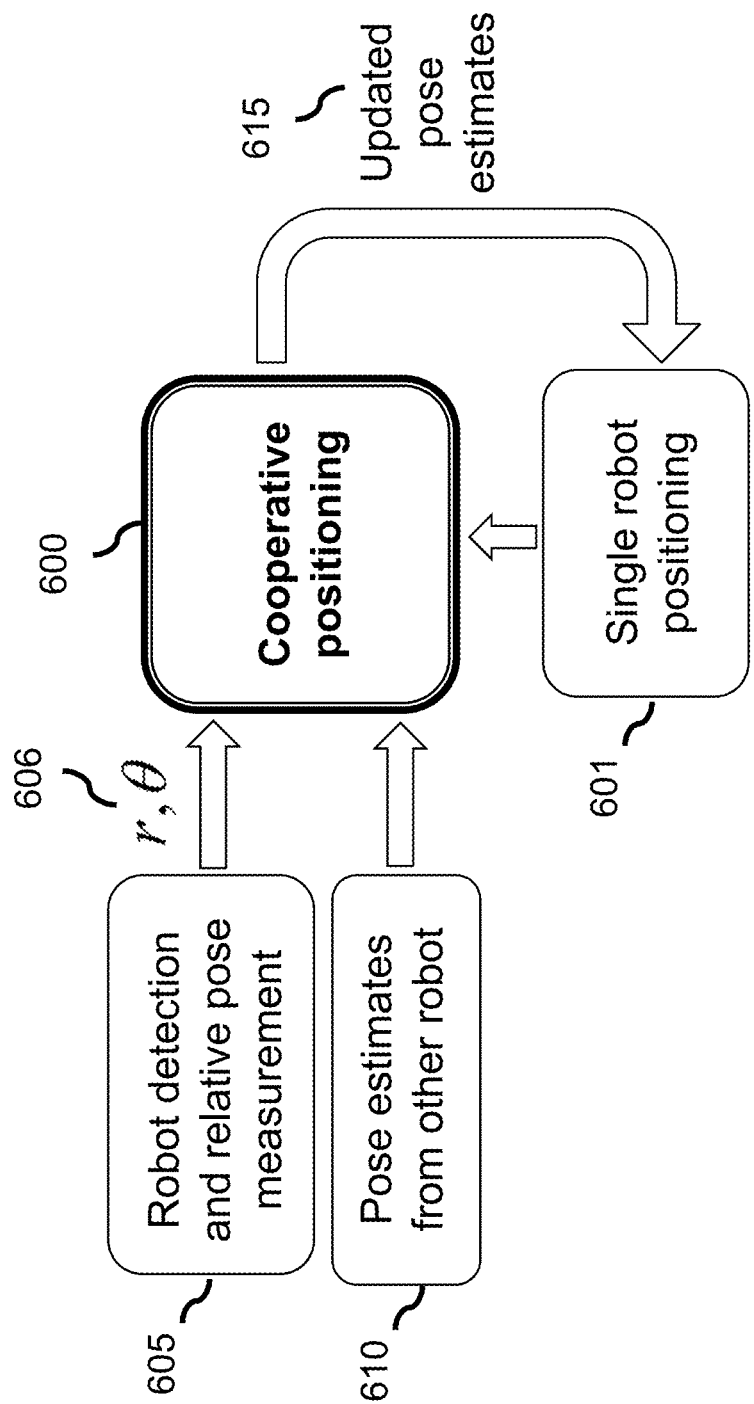
FIG. 6A is a principle block diagram of a cooperative localization pipeline used by some embodiments.

FIG. 6A is a principle block diagram of a cooperative localization pipeline used by some embodiments. Initially, a robot is on its own, moves through the environment and executes a single robot positioning 601 using particle filter 131. When this robot gets in close proximity of some other robot, one or both robots perform robot detection 605. The robot detection results in each robot's awareness that the two robots are close to each other and one or both robots measure relative pose between them 606, e.g., using pose estimation component 137. In case only one robot measures this relative pose, it may send the relative pose measurement to the other robot. Upon this stage, robots exchange their pose particles. Each robot then executes cooperative positioning 600, which fuses its own pose particles obtained from 601, pose particles of the other robot 610 and relative pose measurement 606. The cooperative positioning 600 performed by a robot results in updated pose particles 615 corresponding to that robot, which are returned into the single-robot positioning 601. From there on, each robot is again on its own and continues running the single robot positioning algorithm until it meets other robot(s).

Going into more details, two robots A and B meet at time t and exchange their pose particles. In addition, the robot that measures relative pose between robots sends the measurement to the other robot. One embodiment discloses information fusion algorithm with respect to robot A. However, the equivalent fusion can be performed by the robot B.

Figure 6B:
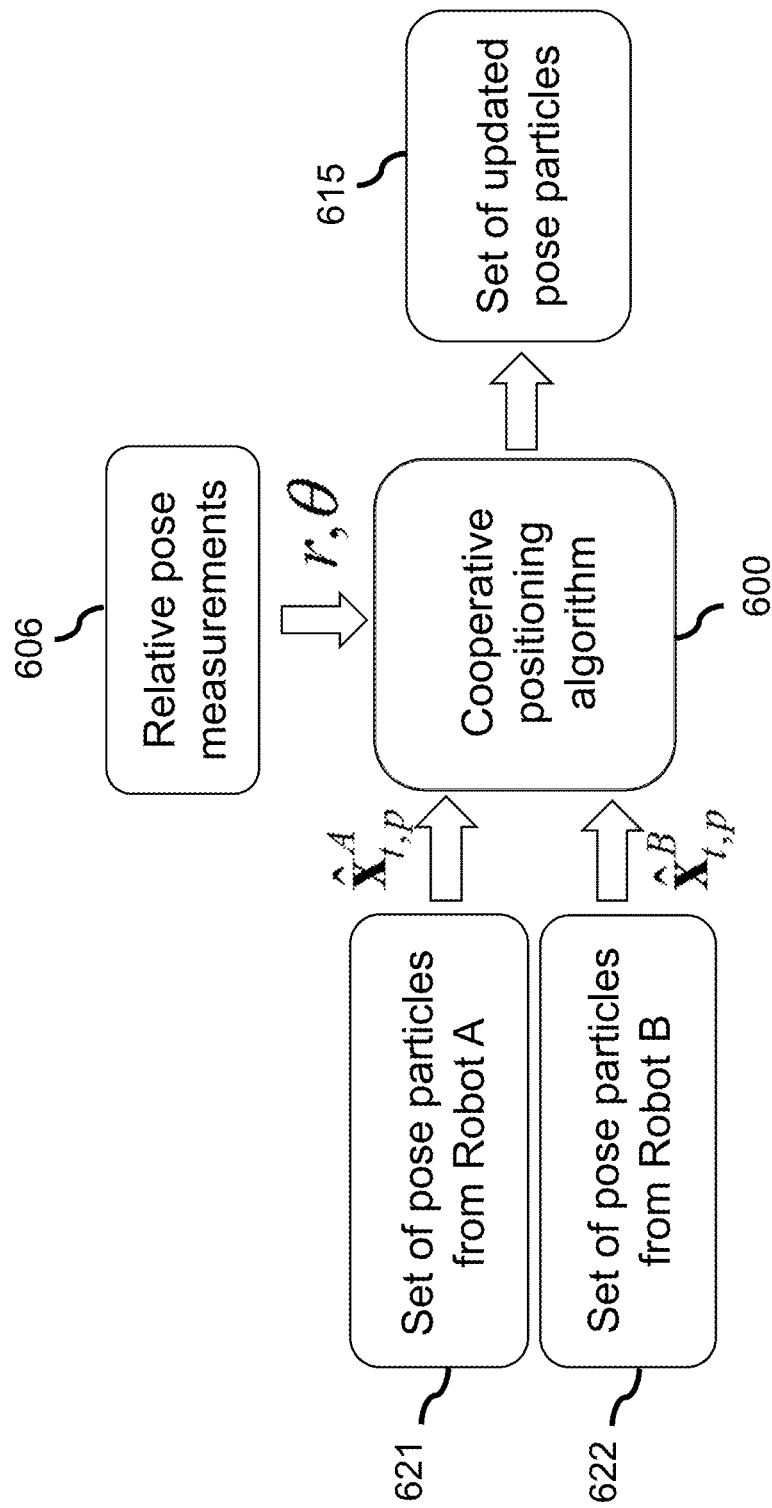
FIG. 6B is a principle block diagram of information fusion performed by a particle tuner according to some embodiments.

FIG. 6B is a principle block diagram of information fusion performed by a particle tuner 133 according to some embodiments. The set of particles representing pose of robot A at time t 621, the set of particles representing pose of robot B at time t and received from robot B 622 are fused together with relative pose measurement(s) 606 according to our algorithm implemented in 600. The output of this block 615 is the resulting set of updated particles representing pose of robot A upon robot's rendezvous.

Assuming, without loss of generality, the robots meet for the first time, all ranging and odometric measurements made by robot A up unit time instant t are collectively denoted as $\mathcal{D}_t^A = \{u_{1:t}^A, z_{1:t}^A\}$. The pose of robot A at time t, described with $p(x_t^A | \mathcal{D}_t^A, m)$, is essentially the prior distribution about robot A's pose at the rendezvous time instant t.

Robot A receives from robot B particles $Z_t^B = \{x_{t,k}^B\}_{k=1}^K$ which robot A treats as $$p(x_t^B | X_t^B) = \frac{1}{K}\sum_{k=1}^K \delta(x_t^B - x_{t,k}^B) \quad (5)$$

Notably, conditioning on ranging and odometric measurements collected by robot B up until time t is avoided in (5) because all what robot A has access to are robot B's particles, which it then uses to build up a probabilistic representation of robot B's pose. In addition to robot B's particles, robot A also has access to the measurements of the relative range r and bearing-heading φ, either directly from its own measurements, or indirectly by receiving them from robot B.

After robot A receives robot B's particles and obtains measurements of r and φ, robot A fuses them with the current estimate of its pose $x_t^A$. Formally, this is done by means of the Bayesian inference which aims to compute the posterior of the pose $x_t^A$, conditioned on all information available to robot A. Subsuming the time index t in all expressions as well as the explicit conditioning on the map m to avoid notation clutter, the posterior of robot A's pose is given by $$p(x^A | \mathcal{D}^A, r, \phi, X^B) = \int p(x^A, x^B | \mathcal{D}^A, r, \phi, X^B)dx^B \stackrel{(1)}{=} \quad (6)$$

$$\eta \int p(r, \phi | x^A, x^B)p(x^A, x^B | \mathcal{D}^A, X^B)dx^B =$$

$$\eta \int p(r, \phi | x^A, x^B)p(x^A | \mathcal{D}^A)p(x^B | X^B)dx^B$$

where $\eta \triangleq p(r, \phi | \mathcal{D}^A, X^B)$ does not depend on $x^B$ and $\stackrel{(1)}{=}$ follows from the Bayes' theorem and the conditional independence of r and φ on $\mathcal{D}^A$ and X, when conditioned on $x^A$ and $x^B$. Substituting (5) into (6) yields $$p(x^A | \mathcal{D}^A, r, \phi, X) = \frac{\eta}{K}p(x^A | \mathcal{D}^A)\sum_{k=1}^K p(r, \phi | x^A, x_k^B) \quad (7)$$

In general, robot A's pose is updated using (7) given its pose distribution $p(x^A | \mathcal{D}^A)$ prior to the rendezvous is known. We use importance sampling to draw samples that represent the posterior of robot A's pose upon the rendezvous. According to the importance sampling terminology, the posterior (7) is the target distribution. The proposal distribution used to draw samples from is $p(x^A | \mathcal{D}^A)$. Thus, the importance sampling starts with $$x_l^A \sim p(x^A | \mathcal{D}^A), l=1, \ldots, L. \quad (8)$$

Given that robot A's prior $p(x^A | \mathcal{D} D^A)$ is represented with particles $X^A$, the particles in (8) are effectively obtained by sampling uniformly at random from $X^A$. The weights associated with the resulting particles are computed from the ratio between the target and proposal distributions $$w_l = \frac{p(x_l^A | \mathcal{D}^A, r, \phi, X)}{p(x_l^A | \mathcal{D}^A)} \propto \sum_{k=1}^K p(r, \phi | x_l^A, x_k^B) \quad (9)$$

and normalized so that $\Sigma_{l=1}^L w_l=1$. Finally, the set of particles $\{x_l^A\}l=1^L$ is updated 615, e.g., resampled according to $\{w_l\}_{l=1}^L$ to yield the final set of particles with uniform weights, which represents robot A's pose posterior after the rendezvous. Alternatively, the updated weights of the particles can be preserved to produce non-uniformly sampled particles.

FIG. 7 is a pseudo-code of the cooperative positioning used by one embodiment. The embodiment is based on recognition that the computational bottleneck of the described method arises from (9), which requires K evaluations of the relative pose probability distribution for each particle $x_i^A$ (provided no repetitions). To reduce the complexity, the embodiment replaces the sum in (9) with a single evaluation of the relative pose distribution at the considered $x_i^A$ and a uniformly at random sampled particle from $X^B$. This results in particle update scheme of linear complexity in the number of robot A's particles. The output from the algorithm is the set of particles $\tilde{X}^A$ representing robot A's pose posterior upon fusing the information received from robot B as well as the relative pose measurements. All computations for the pose posterior update are done locally on robot A's platform.

Analogously, the same information fusion is used by particle tuner of robot B to update robot B's posterior upon receiving robot A's particles representing its pose prior to the rendezvous at time t, as well as the relative pose measurements. The information fusion is executed locally on robot B's platform by the particle tuner of robot B and the output is the set of particles $\tilde{X}^B$ representing robot B's pose posterior upon the rendezvous.

After the rendezvous, each robot supplies its particle filter with the updated particle set $\tilde{X}^A/\tilde{X}^B$ and continues moving through the area on its own in a single-robot mode until the next rendezvous with the same or some other robot. Some embodiments exercise a caution though so that a robot does not update its pose particles based on multiple rendezvous with the same robot in a short time interval. This could effectively lead to fusing the same or similar information multiple times and result in producing over-confident and possibly wrong estimates. For example, in some embodiments the data fusion is performed, e.g., a robot A requests the robot B to transmit its particles upon detecting the rendezvous, only when a distance between the rendezvous and a previous rendezvous of robots A and B is above a threshold. For example, in different embodiments, the distance is one or combination of a time passed since the previous rendezvous, and a distance covered by the robot since the previous rendezvous.

Notably, if robot B's pose is known and relative pose measurements are correct, robot A's pose immediately follows from transforming robot B's pose according to the relative pose measurements. Thus, one embodiment considers the case where robot B's particles prior to the rendezvous are confined within a small space around robot B's true pose, while robot A's particles are spread throughout the area. Thus, each particle $x_j^B$ sampled from $X^B$ is within such a confined space, while a uniformly sampled particle $x_i^A$ is anywhere in the area. Consequently, the weight $w_l$ computed for $x_i^A$ is relatively large if $x_i^A$ and $x_j^B$ are in accordance with the relative pose measurements, and relatively small otherwise. Therefore, assuming relative pose measurements of descent quality, all particles $x_i^A$ from $\mathcal{A}$ which are at about robot A's true pose survive the resampling step and populate the final output $\tilde{X}^A$, which is the desired outcome.

Exemplar Implementation of Particle Tuner

Figure 8A:
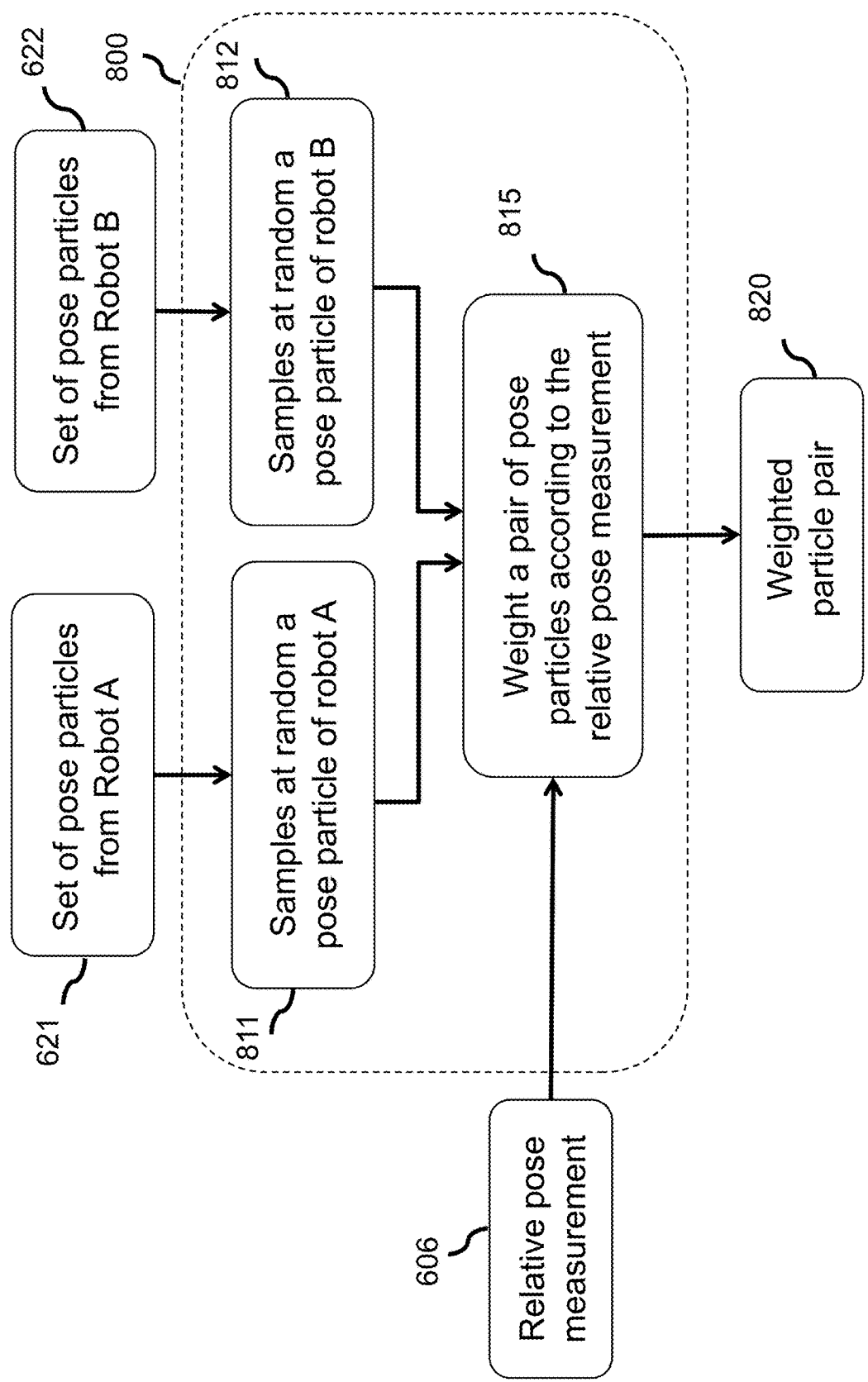
FIG. 8A is a block diagram of a method for computing a weighted particle pair according to some embodiments.

FIG. 8A is a block diagram of a method for computing a weighted particle pair according to some embodiments. The method generates a single pose particle pair and its weight. The method is implemented by a particle tuner of robot A. The method samples at random 811 a pose particle from the set of pose particles 621 corresponding to robot A's pose immediately prior to the rendezvous. Similarly, a pose particle from the set of pose particles 622 corresponding to robot B's pose immediately prior to the rendezvous is also sampled at random 812. The blocks 811 and 812 thus yield a pair of pose particles. The pair of particles is weighted 815 according to the relative pose measurement 606 and relative pose model, for example as suggested by (9). Therefore, the whole process 800 outputs a weighted pair of pose particles 820.

In one embodiment, the particle tuner samples the particles of the robot uniformly randomly, such that any particle from a set of particles of each robot is equally likely to be sampled, i.e., selected from the set. This embodiment is advantageous when all particles have equal weight. In alternative embodiment, the particle tuner samples the particles of the robot non-uniformly randomly according to weights of the particles, so that a particle with a larger weight is more likely to be sampled than a particle with a smaller weight. This embodiment is advantageous when different particles can have different weight.

Figure 8B:
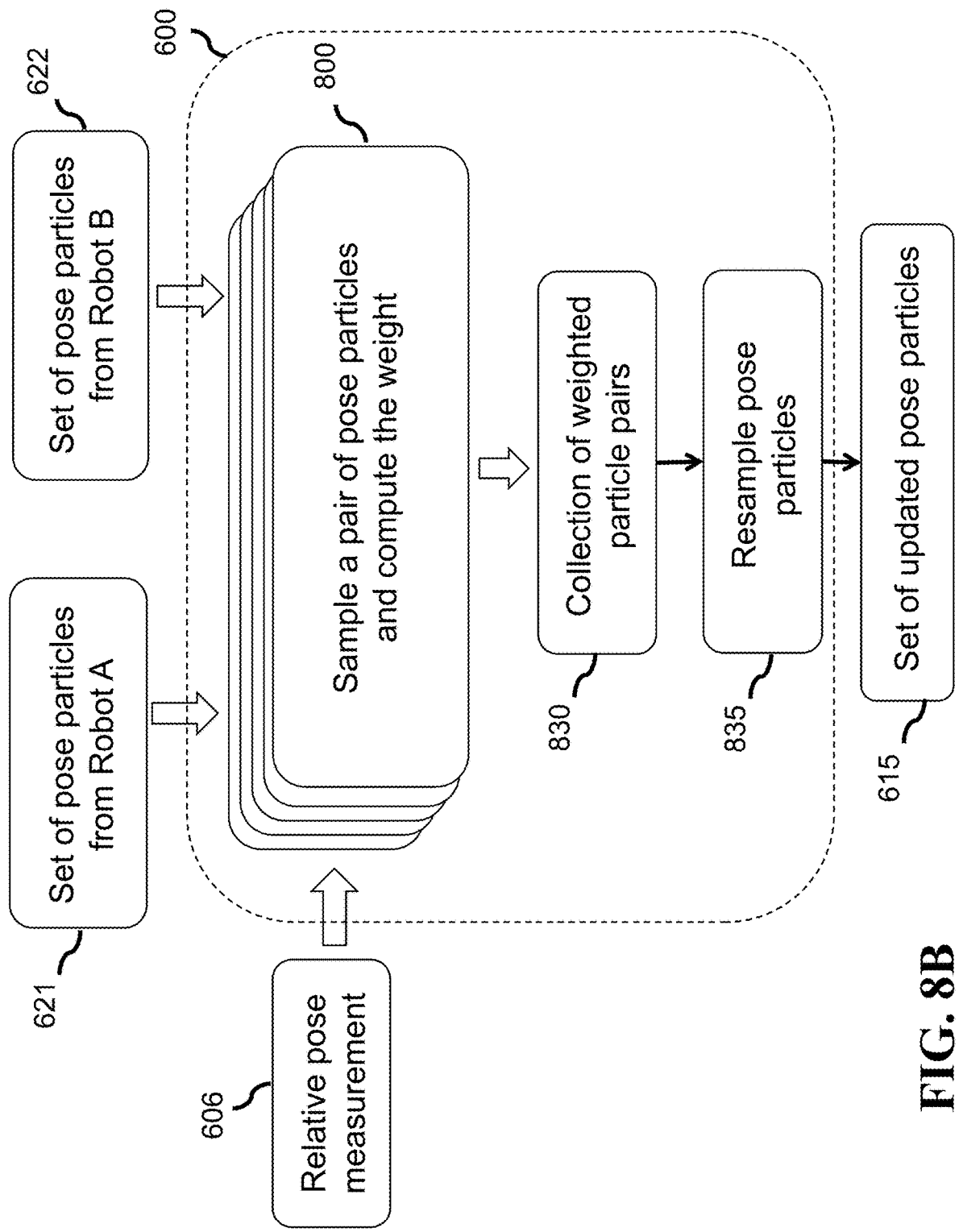
FIG. 8B is a block diagram of a method used by some embodiments for updating particles based on a weighted pair of pose particles generated as shown in FIG. 8A.

FIG. 8B is a block diagram of a method used by some embodiments for updating particles based on a weighted pair of pose particles generated as shown in FIG. 8A. For example, a number of weighted pairs of pose particles are generated 800 in parallel. The parallel implementation yields overall a quick update of pose particles at robots' rendezvous. Each parallel branch outputs one weighted pair of pose particles. The outputs of all parallel branches are collected and their weights are normalized such that they sum up to one 830. To that end, in some embodiments, the particle tuner is configured to pair and weight the paired particles in parallel. For example, the processor is a parallel processor having multiple CPUs.

In some implementations, the normalized weights of the particles are preserved to result in the weighted set of particles. Additionally, or alternatively, in some embodiments the weighted particles are resampled according to their weights to result in equally weighted set of particles. For example, the pose particle pairs are resampled 835 according to the normalized weights such that the pairs with larger weight have more chance to be sampled. The result of this step is a set of pose particle pairs. If the method is executed on robot A, the pose particles corresponding to robot A in the pairs of pose particles are extracted and their set is the set of updated pose particles 615. Similarly, pose particles corresponding to robot B are extracted from the set of pose particle pairs and their set is the set of updated pose particles 615.

Pseudo-Random Sampling

Various embodiments embed random sampling with repetitions of pose particles according to some discrete distribution. Assuming L particles, denote this distribution with vector z such that its l-th entry $z_l$ denotes the probability of selecting the l-th particle. As used herein, $\Sigma_{l=1}^{L} z_l = 1$ and sampling with repetitions means that the same particle can be sampled multiple times. One example of distribution z used in the disclosed methods is uniform distribution, where $z_l = 1/L$, $l=1, \ldots, L$, which is used in generating pairs of pose particles 811, 812. In another example, z, $z_l = w_l / \Sigma_{l=1}^{L} w_l$, and is used for resampling pairs of pose particles 835.

Figure 9A:
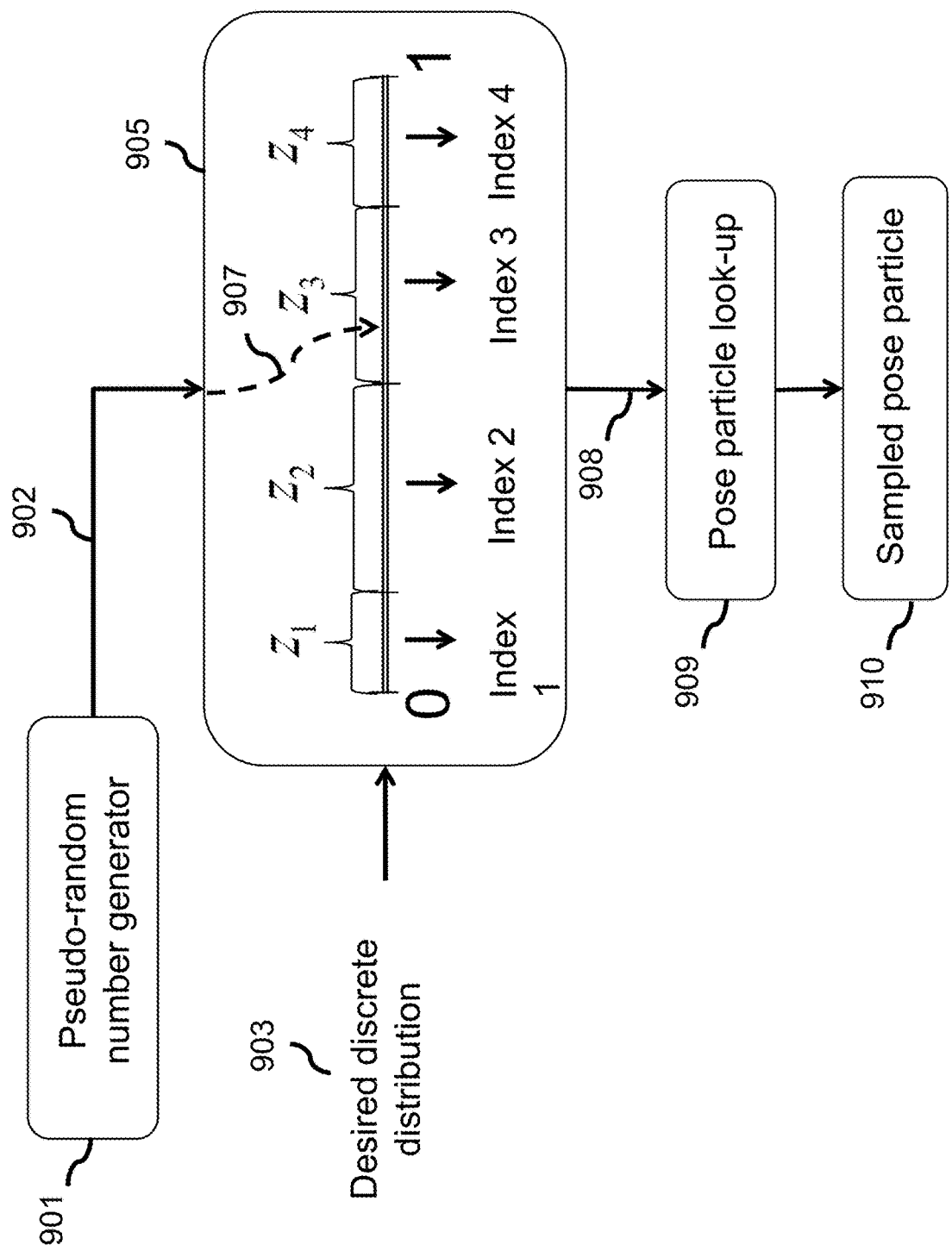
FIG. 9A is a block diagram of pseudo-random particle sampling used by some embodiments to implement particle sampling for a given discrete distribution z.

FIG. 9A is a block diagram of pseudo-random particle sampling used by some embodiments to implement particle sampling for a given discrete distribution z. Without loss of generality, in example of FIG. 9A L=4 such that the desired discrete distribution 903 has entries $z_1$, $z_2$, $z_3$, $z_4$. The pseudo-random number generator 901 uniformly at random samples a number between 0 and 1 such that each number in that range is equally likely to be selected. An index of a sampled particle is determined 905 based on the desired discrete distribution 903 and the pseudo-random number 902. In doing so, the range between 0 and 1 is divided according to the desired discrete distribution into L=4 segments of lengths $z_1$, $z_2$, $z_3$ and $z_4$, and the sampled index is the index of the segment where the pseudo-random number 902 lands 907. As shown in FIG. 9A, the pseudo-random number 902 is between $z_1+z_2$ and $z_1+z_2+z_3$ and, consequently, the output 908 from 905 is index 3. In general, the output 908 is an integer between 1 and L that goes onto pose particle look-up 909. The particle with such an index is delivered as a sampled pose particle 910. The described particle sampling implementation is used in 811 and 812 of FIG. 8A with $z_l=1/L$, l=1, . . . , L. Also, the described particle sampling implementation is used in resampling 835 of FIG. 8B where multiple particles are sampled with $z_l=w_l/\Sigma_{l=1}^{L} w_l$ from the collection of weighted particle pairs 830. The number of times the particle sampling routine from FIG. 9A is invoked in 835 is equal to the desired number of updated particles.

Accordingly, some embodiments use a random number generator for sampling a pose particle. In general, the output of a random number generator should be a purely random number between 0 and 1, where each number from this range is equally likely to be sampled. Since the implementation of the random number generator in a processor is deterministic, the output from this block cannot be purely random. In fact, the output from the random number generator is deterministic. However, the random number generator is designed such that in a long run, the sequence it produces resembles a sequence of random numbers. For those reasons, the random number generator is commonly referred to as a pseudo-random number generator, e.g., the pseudo-random number generator 901.

As used herein, by "resembles" mean that the pseudo-random number generator 901 generated sequence approximately satisfies two properties that a purely random and infinitely long sequence coining out from a random number generator would satisfy. The first property is related to having the generated numbers abide with uniform distribution, meaning that the histogram of the generated numbers is flat. The second property is related to having the generated numbers be unrelated to each other, which translates to having the normalized autocorrelation of the sequence be delta function (equal to one at zero lag and zero at all non-zero lags).

Figure 9B:
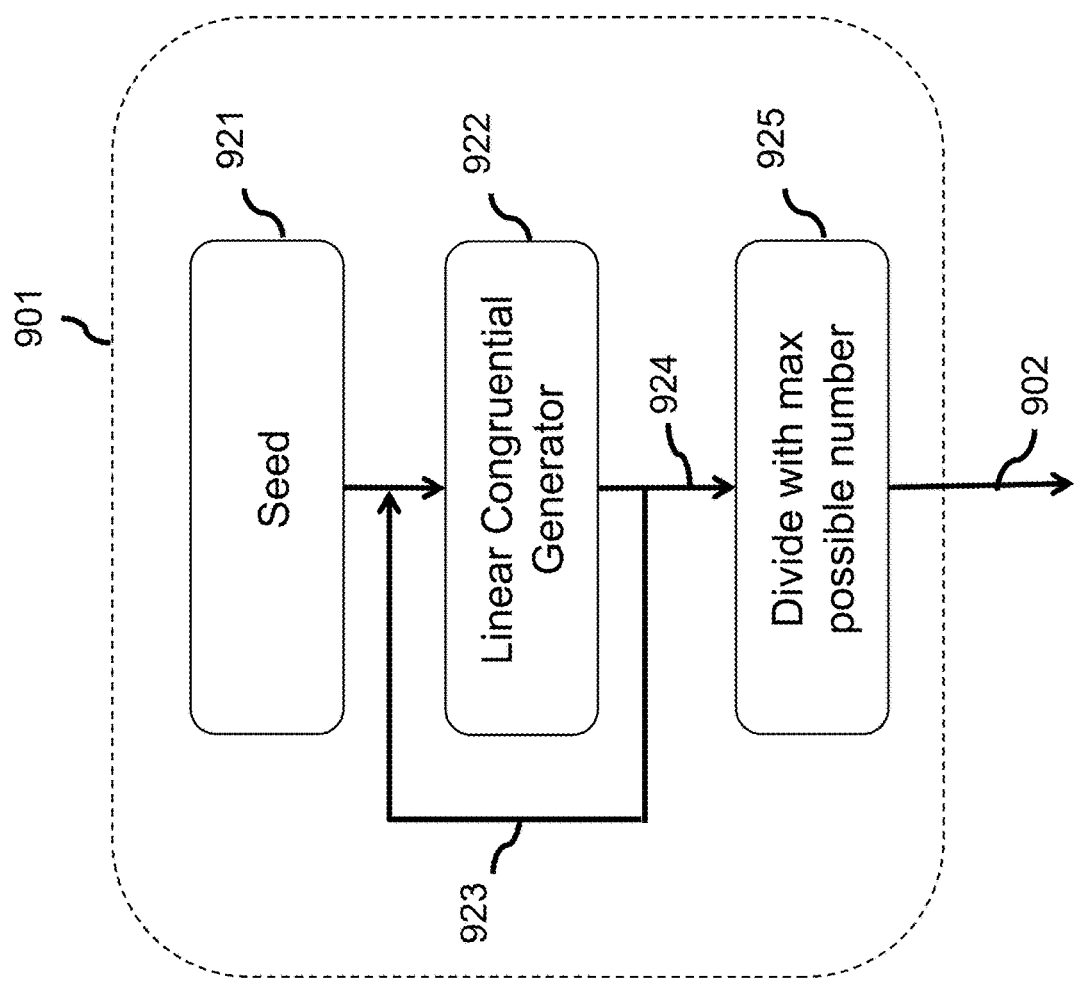
FIG. 9B is a block diagram of pseudo-random number generation used by one embodiment.

FIG. 9B is a block diagram of pseudo-random number generation used by one embodiment. The pseudo-random number generator 901 includes a linear congruential generator (LCG) 922 which generates a sequence of pseudo-random integers according to $$y_n = ay_{n-1} + b \bmod m \quad (10)$$

where $y_n$ is the n-th number in the sequence, a, b and m are fixed scalars, while mod denotes a modulus operation which yields the remainder of the division of $ay_{n-1}+b$ with m. Thus, $y_n$ can be any integer between 0 and m −1. Commonly, m is the largest integer than can be stored in the processor.

The first entry in the sequence, $y_1$, is generated based on $y_0$ which is provided by the pre-fixed seed 921. For n>1, $y_n$ is generated based on $y_{n-1}$ such that $y_{n-1}$ needs to be stored and fed back 923. Each entry in the sequence of pseudo-random integers 924 is divided by m 925 to yield a sequence 902 of pseudo-random numbers between 0 and 1. Other methods may be used to generate a sequence of pseudo-random numbers. For example, more outputs $y_{n-k}$, k>0 can be fed back to generate $y_n$ using congruence relation.

Effects of Some Embodiments

Other methods for information fusion update pose particles of a robot based on pose particles of two robots prior to their rendezvous and relative pose measurement. As such, one method uses density trees to estimate robot's pose from its particles before fusion. In comparison to that method, the methods disclosed herein do not need to employ density trees and hence does not incur additional computational cost. Other method considers all pairs of pose particles originating from different robots and each pair is weighted based on how much its pose particles agree with the relative pose measurement. Assuming particle cloud of each robot contains L particles, the overall computational cost of computing weights of all possible particle pairs is of the order $L^2$. In comparison, the methods disclosed herein generate L pairs of particles so that the computational complexity of pose particle update is of the order L. In yet another method, pose particles of one robot are clustered into S clusters. Then, all pairwise combinations between S particles representing each of S clusters and L pose particles from the other robot are formed and their weights are computed based on the agreement with the relative pose measurement. Therefore, the complexity of weight computation in this method is thus of the order KS.

Aside from lower computational complexity, the methods disclosed herein have an additional benefit with respect to other methods. In particular, since pairs of particles are independent of each other, generation and weight computation of particle pairs can be done in parallel, yielding to a possibly significant saving in time needed to update pose particles upon the rendezvous. In other words, the amount of time needed to generate and compute all particle pairs in our method is equal to the amount of time needed to generate and compute the weight of a single particle pair. In comparison, the method with clusters requires KS times longer period to just compute weights of particle pairs, plus additional time period to perform clustering.

The methods disclosed herein are derived by meretriciously abiding with the statistical inference principles and are optimal in the Bayesian inference framework, the above discussed benefits do not come at a cost of deteriorated performance. Instead, performance guarantees of our method stein from its optimality in the Bayesian sense and are the same as for a conventional particle filter.

Nonuniform Particle Weights

Some implementations of various embodiments assume that pose particles of both robots immediately prior to their rendezvous are with uniform weights. It means that each particle in a set of pose particles containing L particles has weight 1/L. Also, the described method outputs a set of updated pose particle upon the rendezvous after resampling 835, meaning that the updated pose particles have uniform weight. Overall, the input and output pose particles are assumed to have uniform weight.

Some other implementations use other options for pose particle weights. As such, referring to FIG. 8B, one embodiment of the disclosed method may skip resampling pose particle pairs 835 and, instead, directly output pose particles corresponding to the considered robot with normalized weights. Similarly, the set of pose particles from robot A 621 and/or robot B 622 may contain weighted particles. If so, it is common that the weights are normalized so that they sum up to one. If not, they should be first normalized. Then, referring to FIG. 8A, the random sampling of pose particles 811 and/or 812 is not uniform, but according to particle weights such that the particles carrying larger weight are more likely to be selected.

Multiple Measurements of Relative Pose

In some embodiments, robots measure their relative pose when they meet. The relative pose measurement may be a single measurement made by only one robot and communicated to the other. Alternatively, each robot may measure the relative pose and share the measurements with the other robot. As yet another alternative and more general case, each robot may perform multiple relative pose measurements and exchange them with the other robot. As a result, each robot may have M relative pose measurements $r_1, r_2, \ldots, r_M$ and $\phi_1, \phi_2, \ldots, \phi_M$. In that case, and assuming the robots do not move while M measurements have been taken, the weight $w_l$ is computed as $$w_l \propto p(r_1, r_2, \ldots, r_M, \phi_1, \phi_2, \ldots, \phi_M | x_l^A, x_l^B) \quad (11)$$

Assuming multiple pose measurements are conditionally independent for given robots' poses $x_l^A$ and $x_l^B$, the weight $w_l$ is given by $$w_l \propto \Pi_{m=1}^{M} p(r_m, \phi_m | x_l^A, x_l^B) \quad (12)$$

where $p(r_m, \phi_m | x_l^A, x_l^B)$ is evaluated from the relative pose measurement model such as one in (4).

Multiple Rendezvous of Two Robots

Two robots continue on their own upon rendezvous following higher-level instructions depending on the task they are executing. Given that they may meet again, a natural question arises as to how to update pose particles at their following rendezvous. In general, the same methods can apply. However, if two robots meet two or more times in a relatively short time interval, using the described method may lead to fusing the same information multiple times. The resulting pose particles then shrink more than they should, resulting in over-confident pose estimates. To ensure this does not happen, in some implementations the robots do not perform information fusion unless one or both have traversed at least a certain, application-dependent, distance. By allowing robots to exchange and fuse information only after traversing a certain distance, we ensure that the amount of new information the robots have collected since their last rendezvous is large enough to avoid obtaining severely over-confident pose estimates.

Rendezvous of Multiple Robots

The disclosed methods are scalable to cooperative localization of more than two robots. Namely, suppose robot A first meets robot B, moves a bit and then meets robot C. In such a scenario, robot A first updates its pose particles based on the information it receives from robot B and performs single robot positioning until it meets robot C. Then robot A updates its most recent pose particles using the information it receives from robot C.

Similarly, assume robots A, B and C meet at the same time. In such a case, robot A first updates its pose particles based on the information it receives from one of the robots, for example, robot B. Then, robot A updates its most recent pose particles based on the information it receives from the other robot, for example robot C. Other robots proceed with updating their pose particles in a similar way.

Figure 10:
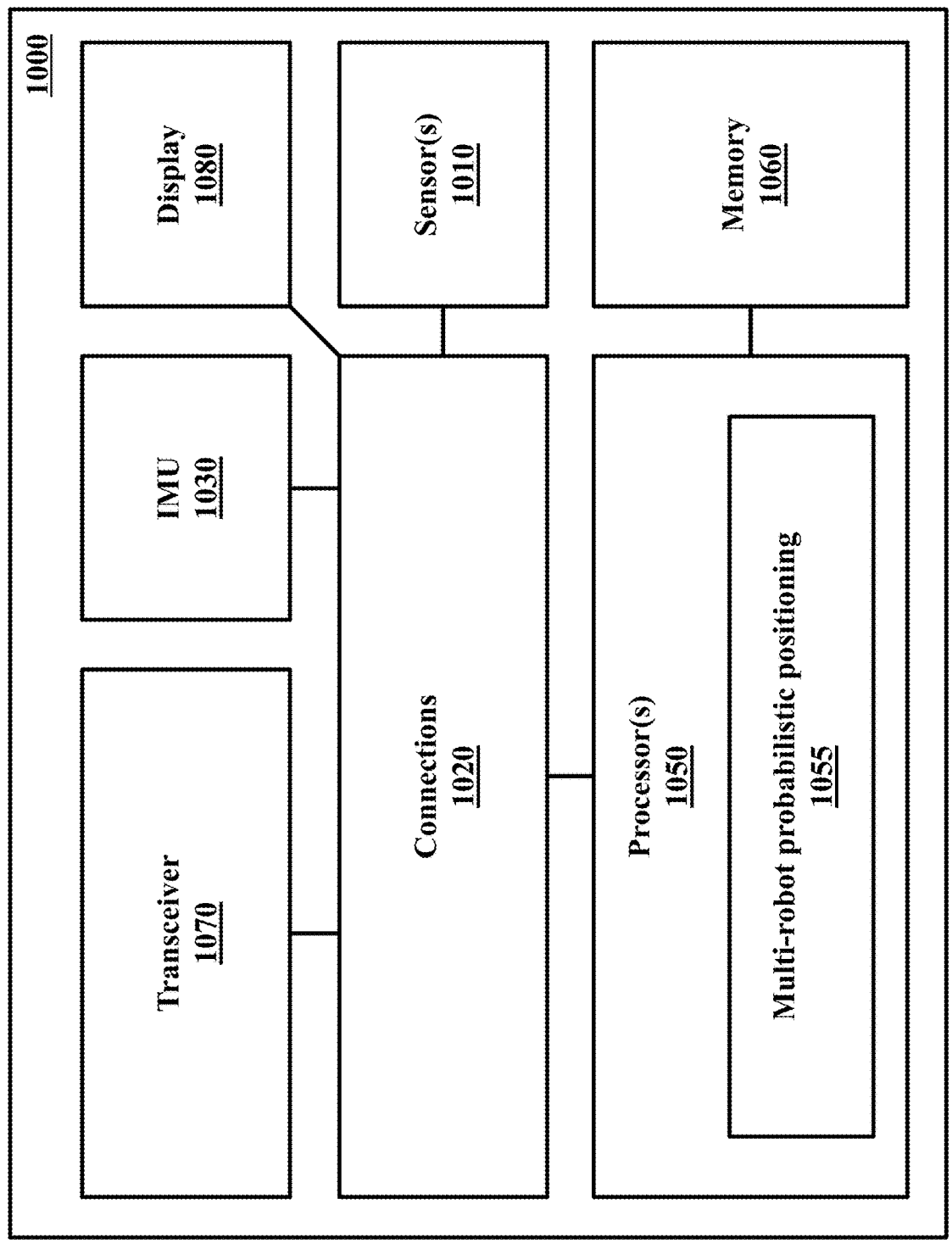
FIG. 10 shows a block diagram of a positioning system of a robot according to some embodiments.

FIG. 10 shows a block diagram of a positioning system 1000 of a robot according to some embodiments. The system 1000 can be implemented internal to the robot A and/or B. Additionally or alternatively, the system 1000 can be communicatively connected to the robot A and/or B.

The system 1000 can include one or combination of a camera 1010, an inertial measurement unit (IMU) 1030, a processor 1050, a memory 1060, a transceiver 1070, and a display/screen 1080, which can be operatively coupled to other components through connections 1020. The connections 1020 can comprise buses, lines, fibers, links or combination thereof.

The transceiver 1070 can, for example, include a transmitter enabled to transmit one or more signals over one or more types of wireless communication networks and a receiver to receive one or more signals transmitted over the one or more types of wireless communication networks. The transceiver 1070 can permit communication with wireless networks based on a variety of technologies such as, but not limited to, femtocells, Wi-Fi networks or Wireless Local Area Networks (WLANs), which may be based on the IEEE 802.11 family of standards, Wireless Personal Area Networks (WPANS) such Bluetooth, Near Field Communication (NFC), networks based on the IEEE 802.15x family of standards, and/or Wireless Wide Area Networks (WWANs) such as LTE, WiMAX, etc. The system 400 can also include one or more ports for communicating over wired networks.

In some embodiments, the system 1000 can comprise image sensors such as CCD or CMOS sensors, lasers and/or camera 1010, which are hereinafter referred to as "sensor 1010". For example, the sensor 1010 can convert an optical image into an electronic or digital image and can send acquired images to processor 1050. Additionally, or alternatively, the sensor 1010 can sense the light reflected from a target object in a scene and submit the intensities of the captured light to the processor 1050.

For example, the sensor 1010 can include color or grayscale cameras, which provide "color information." The term "color information" as used herein refers to color and/or grayscale information. In general, as used herein, a color image or color information can be viewed as comprising 1 to N channels, where N is some integer dependent on the color space being used to store the image. For example, an RGB image comprises three channels, with one channel each for Red, Blue and Green information.

For example, the sensor 1010 can include a depth sensor for providing "depth information." The depth information can be acquired in a variety of ways using depth sensors. The term "depth sensor" is used to refer to functional units that may be used to obtain depth information independently and/or in conjunction with some other cameras. For example, in some embodiments, the depth sensor and the optical camera can be part of the sensor 1010. For example, in some embodiments, the sensor 1010 includes RGBD cameras, which may capture per-pixel depth (D) information when the depth sensor is enabled, in addition to color (RGB) images.

As another example, in some embodiments, the sensor 1010 can include a 3D Time Of Flight (3DTOF) camera. In embodiments with 3DTOF camera, the depth sensor can take the form of a strobe light coupled to the 3DTOF camera, which can illuminate objects in a scene and reflected light can be captured by a CCD/CMOS sensor in the sensor 1010.

Depth information can be obtained by measuring the time that the light pulses take to travel to the objects and back to the sensor.

As a further example, the depth sensor can take the form of a light source coupled to the sensor 1010. In one embodiment, the light source projects a structured or textured light pattern, which can include one or more narrow bands of light, onto objects in a scene. Depth information is obtained by exploiting geometrical distortions of the projected pattern caused by the surface shape of the object. One embodiment determines depth information from stereo sensors such as a combination of an infra-red structured light projector and an infra-red camera registered to a RGB camera.

In some embodiments, the sensor 1010 includes stereoscopic cameras. For example, a depth sensor may form part of a passive stereo vision sensor, which may use two or more cameras to obtain depth information for a scene. The pixel coordinates of points common to both cameras in a captured scene may be used along with camera pose information and/or triangulation techniques to obtain per-pixel depth information.

In some embodiments, the system 1000 can be operatively connected to multiple sensors 1010, such as dual front cameras and/or a front and rear-facing cameras, which may also incorporate various sensors. In some embodiments, the sensors 1010 can capture both still and video images. In some embodiments, the sensor 1010 can include RGBD or stereoscopic video cameras capable of capturing images at, e.g., 30 frames per second (fps). In one embodiment, images captured by the sensor 1010 can be in a raw uncompressed format and can be compressed prior to being processed and/or stored in memory 1060. In some embodiments, image compression can be performed by the processor 1050 using lossless or lossy compression techniques.

In some embodiments, the processor 1050 can also receive input from IMU 1030. In other embodiments, the IMU 1030 can comprise 3-axis accelerometer(s), 3-axis gyroscope(s), and/or magnetometer(s). The IMU 1030 can provide velocity, orientation, and/or other position related information to the processor 1050. In some embodiments, the IMU 1030 can output measured information in synchronization with the capture of each image frame by the sensor 1010. In some embodiments, the output of the IMU 1030 is used in part by the processor 1050 to fuse the sensor measurements and/or to further process the fused measurements.

The system 1000 can also include a screen or display 1080 rendering images, such as color and/or depth images. In some embodiments, the display 1080 can be used to display live images captured by the sensor 1010, fused images, augmented reality (AR) images, graphical user interfaces (GUIs), and other program outputs. In some embodiments, the display 1080 can include and/or be housed with a touchscreen to permit users to input data via some combination of virtual keyboards, icons, menus, or other GUIs, user gestures and/or input devices such as styli and other writing implements. In some embodiments, the display 1080 can be implemented using a liquid crystal display (LCD) display or a light emitting diode (LED) display, such as an organic LED (OLED) display. In other embodiments, the display 480 can be a wearable display. In some embodiments, the result of the fusion can be rendered on the display 1080 or submitted to different applications that can be internal or external to the system 1000.

Exemplary system 1000 can also be modified in various ways in a manner consistent with the disclosure, such as, by adding, combining, or omitting one or more of the functional blocks shown. For example, in some configurations, the system 1000 does not include the IMU 1030 or the transceiver 1070. Further, in certain example implementations, the system 1000 include a variety of other sensors (not shown) such as an ambient light sensor, microphones, acoustic sensors, ultrasonic sensors, laser range finders, etc. In some embodiments, portions of the system 400 take the form of one or more chipsets, and/or the like.

The processor 1050 can be implemented using a combination of hardware, firmware, and software. The processor 1050 can represent one or more circuits configurable to perform at least a portion of a computing procedure or process related to sensor fusion and/or methods for further processing the fused measurements. The processor 1050 retrieves instructions and/or data from memory 1060. The processor 1050 can be implemented using one or more application specific integrated circuits (ASICs), central and/or graphical processing units (CPUs and/or GPUs), digital signal processors (DSPs), digital signal processing devices (DSPDs), programmable logic devices (PLDs), field programmable gate arrays (FPGAs), controllers, micro-controllers, microprocessors, embedded processor cores, electronic devices, other electronic units designed to perform the functions described herein, or a combination thereof.

The memory 1060 can be implemented within the processor 1050 and/or external to the processor 1050. As used herein the term "memory" refers to any type of long term, short term, volatile, nonvolatile, or other memory and is not to be limited to any particular type of memory or number of memories, or type of physical media upon which memory is stored. In some embodiments, the memory 1060 holds program codes that facilitate the multi-robot probabilistic positioning 1055.

For example, the memory 1060 can store the measurements of the sensors, such as still images, depth information, video frames, program results, as well as data provided by the IMU 1030 and other sensors. The memory 1060 can store a memory storing a geometry of the robot, a map of the space, a kinematic model of the robot, and a dynamic model of the robot. In general, the memory 1060 can represent any data storage mechanism. The memory 1060 can include, for example, a primary memory and/or a secondary memory. The primary memory can include, for example, a random access memory, read only memory, etc. While illustrated in FIG. 4 as being separate from the processors 1050, it should be understood that all or part of a primary memory can be provided within or otherwise co-located and/or coupled to the processors 1050.

Secondary memory can include, for example, the same or similar type of memory as primary memory and/or one or more data storage devices or systems, such as, for example, flash/USB memory drives, memory card drives, disk drives, optical disc drives, tape drives, solid state drives, hybrid drives etc. In certain implementations, secondary memory can be operatively receptive of, or otherwise configurable to a non-transitory computer-readable medium in a removable media drive (not shown). In some embodiments, the non-transitory computer readable medium forms part of the memory 1060 and/or the processor 1050.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications can be made within the spirit and scope of the invention.

Therefore, it is the object of the appended claims to cover all such variations and modifications as come within the true spirit and scope of the invention.

We claim:

1. A robot for estimating a pose of the robot using a particle filter exchanging particles with a neighboring robot, wherein the pose includes one or a combination of a location of the robot and an orientation of the robot, comprising:
    a motor configured to change the pose of the robot;
    a transmitter configured to transmit particles of the robot to the neighboring robot upon detecting rendezvous with the neighboring robot, wherein each of the particles of the robot defines a probability of a value of the pose of the robot;
    a receiver configured to receive particles of the neighboring robot, wherein each of the particles of the neighboring robot defines a probability of a value of a pose of the neighboring robot; and
    a tracking system, comprising:
        an input interface configured to receive data indicative of a value of a relative pose between a current pose of the robot and a current pose of a neighboring robot;
        a particle filter configured to track the pose of the robot using a set of the particles of the robot;
        a particle tuner configured to
            pair an arbitrarily sampled particle of the robot with an arbitrarily sampled particle of the neighboring robot,
            determine a weight of the paired arbitrarily sampled particle of the robot and the arbitrarily sampled particle of the neighboring robot in reverse proportion to an error between:
                a relative pose defined by the paired particles arbitrarily sampled particle of the robot and the arbitrarily sampled particle of the neighboring robot, and
                the relative pose between the current pose of the robot and the current pose of the neighboring robot, and
            update the particles of the robot in accordance with the weight of the arbitrarily sampled particle of the robot and the arbitrarily sampled particle of the neighboring robot; and
        a processor configured to track, in response to a change of the pose of the robot, the pose of the robot using the particle filter, and to update, in response to receiving the data, the particles of the robot using the particle turner.

2. The robot of claim 1, wherein the particle tuner randomly samples the particles of the robot to pair the arbitrarily sampled particle of the robot with the arbitrarily sampled particle of the neighboring robot.

3. The robot of claim 2, wherein the particle tuner samples the particles of the robot uniformly randomly.

4. The robot of claim 2, wherein the particle tuner samples the particles of the robot non-uniformly randomly according to weights of the particles of the robot, such as a particle with a larger weight is more likely to be sampled than a particle with a smaller weight.

5. The robot of claim 1, wherein the particle tuner, to update the particles of the robot, is configured to
    resample the particles of the robot according to their weights to produce a specific set of pose particles representing the pose of the robot with equal weights.

6. The robot of claim 1, wherein the particle tuner, to update the particles of the robot, is configured to
    normalize weights of the particles of the robot to produce a specific set of pose particles representing the pose of the robot with different weights.

7. The robot of claim 1, further comprising:
    a pseudo-random generator configured to select numbers from a set of numbers with equal probability, such that any number is equally likely to be selected from the set of numbers, wherein the particle tuner is configured to select a number using the pseudo-random generator and select one or a combination of a particle of the robot and a particle of the neighboring robot based on the number to form paired particles, wherein the paired particles are formed by pairing the arbitrarily sampled particle of the robot and the arbitrarily sampled particle of the neighboring robot.

8. The robot of claim 1, wherein the processor requests the neighboring robot to transmit its particles upon detecting the rendezvous with the neighboring robot, based on a distance between the rendezvous and a previous rendezvous.

9. The robot of claim 8, wherein the distance is one or a combination of a time passed since the previous rendezvous, and a distance covered by the robot since the previous rendezvous.

10. The robot of claim 1, wherein the particle tuner is configured to pair and weight the arbitrarily sampled particle of the robot and the arbitrarily sampled particle of the neighboring robot in parallel.

11. The robot of claim 10, wherein the processor is a parallel processor.

12. The robot of claim 1, further comprising:
    at least one sensor configured to detect the rendezvous with the neighboring robot when the robot is in line of sight of the neighboring robot and provide environmental and odometry measurements to the particle filter for tracking the pose of the robot.

13. A method for estimating a pose of a robot using a particle filter of the robot exchanging particles with a neighboring robot, wherein the pose includes one or a combination of a location of the robot and an orientation of the robot, wherein the method uses a processor coupled with stored instructions implementing the method, wherein the instructions, when executed by the processor carry out steps of the method, comprising:

transmitting particles of the robot to the neighboring robot upon detecting rendezvous of the robot with the neighboring robot, wherein each of the particles of the robot defines a probability of a value of the pose of the robot;

receiving particles of the neighboring robot, wherein each of the particles of the neighboring robot defines a probability of a value of a pose of the neighboring robot;

receiving data indicative of a value of a relative pose between a current pose of the robot and a current pose of the neighboring robot;

tracking the pose of the robot by the particle filter of the robot using a set of the particles of the robot;

pairing an arbitrarily sampled particle of the robot with an arbitrarily sampled particle of the neighboring robot;

determining a weight of the paired arbitrarily sampled particle of the robot and the arbitrarily sampled particle of the neighboring robot in reverse proportion to an error between:

a relative pose defined by the paired arbitrarily sampled particle of the robot and the arbitrarily sampled particle of the neighboring robot, and the relative pose between the current pose of the robot and the current pose of the neighboring robot; and updating the particles of the robot in accordance with the weight of the arbitrarily sampled particle of the robot and the arbitrarily sampled particle of the neighboring robot, such that the processor executing the method, tracks, in response to a change of the pose of the robot, the pose of the robot using the particle filter, and updates, in response to receiving the data, the particles of the robot.

14. The method of claim 13, wherein the particles of the robot are randomly sampled to pair the arbitrarily sampled particle of the robot with the arbitrarily sampled particle of the neighboring robot.

15. The method of claim 14, wherein the particles of the robot are sampled uniformly randomly.

16. The method of claim 14, wherein the particles of the robot are sampled non-uniformly randomly according to weights of the particles of the robot, such as a particle with a larger weight is more likely to be sampled than a particle with a smaller weight.

17. The method of claim 13, further comprising:

resampling the particles of the robot according to their weights to produce a specific set of pose particles representing the pose of the robot with equal weights.

18. The method of claim 13, further comprising:

normalizing weights of the particles of the robot to produce a specific set of pose particles representing the pose of the robot with different weights.

19. The method of claim 13, further comprising:

requesting, the neighboring robot to transmit the particles of the neighboring robot upon detecting the rendezvous with the neighboring robot, based on a distance between the rendezvous and a previous rendezvous, wherein the distance is one or combination of a time passed since the previous rendezvous, and a distance covered by the robot since the previous rendezvous.

20. A non-transitory computer-readable storage medium embodied thereon a program executable by a processor to execute a set of operations for estimating a pose of a robot using a particle filter of the robot exchanging particles with a neighboring robot, wherein the pose includes one or a combination of a location of the robot and an orientation of the robot, the operations comprising:

transmitting particles of the robot to the neighboring robot upon detecting rendezvous of the robot with the neighboring robot, wherein each of the particles of the robot defines a probability of a value of the pose of the robot;

receiving particles of the neighboring robot, wherein each of the particles of the neighboring robot defines a probability of a value of a pose of the neighboring robot;

receiving data indicative of a value of a relative pose between a current pose of the robot and a current pose of a neighboring robot;

tracking the pose of the robot by the particle filter of the robot using a set of the particles of the robot;

pairing an arbitrarily sampled particle of the robot with an arbitrarily sampled particle of the neighboring robot;

determining a weight of the arbitrarily sampled particle of the robot and the arbitrarily sampled particle of the neighboring robot in reverse proportion to an error between:

a relative pose defined by the arbitrarily sampled particle of the robot and the arbitrarily sampled particle of the neighboring robot, and the relative pose between the current pose of the robot and the current pose of the neighboring robot; and updating the particles of the robot in accordance with the weight of the arbitrarily sampled particle of the robot and the arbitrarily sampled particle of the neighboring robot, such that the processor executing the method, tracks, in response to a change of the pose of the robot, the pose of the robot using the particle filter, and updates, in response to receiving the data, the particles of the robot.

* * * * *